United States Patent [19]

Misawa et al.

[11] Patent Number: 5,470,660
[45] Date of Patent: Nov. 28, 1995

[54] IRON OXIDE PARTICLES AND PROCESS FOR PRODUCING THE SAME

[75] Inventors: Hiromitsu Misawa, Hatsukaichi; Kazuo Fujioka; Koso Aoki, both of Hiroshima; Eiichi Kurita, Yokohama; Yoji Okano, Hiroshima; Minoru Kozawa, Higashihiroshima, all of Japan

[73] Assignee: Toda Kogyo Corporation, Hiroshima, Japan

[21] Appl. No.: 131,668

[22] Filed: Oct. 5, 1993

[30] Foreign Application Priority Data

| Oct. 6, 1992 | [JP] | Japan | 4-292265 |
| Oct. 15, 1992 | [JP] | Japan | 4-304689 |
| Oct. 15, 1992 | [JP] | Japan | 4-304691 |
| Oct. 15, 1992 | [JP] | Japan | 4-304790 |

[51] Int. Cl.$^6$ ................................................. B32B 15/02
[52] U.S. Cl. .................. 428/403; 252/62.58; 252/62.59
[58] Field of Search ............... 428/403; 252/62.58, 252/62.59, 62.63, 62.67

[56] References Cited

U.S. PATENT DOCUMENTS

| 2,913,419 | 11/1959 | Alexander | 252/313 |
| 4,917,952 | 4/1990 | Katamoto et al. | 428/403 |
| 5,260,132 | 11/1993 | Nakazumi et al. | 428/403 |
| 5,294,492 | 3/1994 | Oka et al. | 428/403 |

FOREIGN PATENT DOCUMENTS

| 0453261A1 | 10/1991 | European Pat. Off. . |
| 53-36538 | 4/1978 | Japan . |
| 53-11537 | 4/1978 | Japan . |
| 53-94932 | 8/1978 | Japan . |
| 54-7292 | 4/1979 | Japan . |
| 57-201244 | 12/1982 | Japan . |
| 59-223451 | 12/1984 | Japan . |
| 60-26953 | 2/1985 | Japan . |
| 63-8750 | 1/1988 | Japan . |
| 2-80 | 1/1990 | Japan . |
| 2-73362 | 3/1990 | Japan . |
| 2-181757 | 7/1990 | Japan . |
| 3-122658 | 5/1991 | Japan . |
| 3-221965 | 9/1991 | Japan . |
| 4-21860 | 4/1992 | Japan . |

OTHER PUBLICATIONS

Chemical Abstracts, vol. 85, No. 12, Sep. 1976, Abstract No. 79808f p. 109, col. L.
Chemical Abstracts, vol. 86 No. 12, Mar. 1977 abstract No. 74541z, p. 102, col L.
Chemical Abstracts, vol. 86, No. 16, Apr. 1977 abstract No. 108057p p. 77, col. R.
Chemical Abstracts, vol. 87, No. 10, Sep. 1977 abstract No. 69886g p. 87 col. R.
Chemical Abstracts, vol. 89, No. 6, Aug. 1978 abstract No. 45129c p. 64 col. R.
Chemical Abstracts, vol. 89, No. 6 Aug. 1978 Abstract No. 44678u, p. 33, col. L.
Database WPI Week 7918 Derwent AN 78-37334A Apr. 1978.

*Primary Examiner*—John Goodrow
*Attorney, Agent, or Firm*—Nixon & Vanderhye

[57] ABSTRACT

Disclosed herein is iron oxide particles comprising:

100 parts by weight of material iron oxide particles having a specific surface area represented by the following formula (1):

$$6/(\rho \cdot d_3) \times \phi_s \quad (1)$$

wherein $\rho$ represents a specific gravity of said iron oxide particles, $d_3$ represents an area-average particle diameter (0.1 µm $\leq d_3 \leq$ 1.0 µm) and $\phi_s$ represents an area shape factor) (1.0 $\leq \phi_s \leq$ 2.0); and 0.25 to 10 parts by weight (calculated as an oxide) of the fine particles of the oxygen compound, the fine particles of the hydrate or mixed fine particles thereof of one element selected from the group consisting of Al, Si, Zr and Ti, which are adhered to the surfaces of said iron oxide particles;

the increment of said specific surface area of said iron oxide particles being 1 to 6 m$^2$/g, and the increment of said specific surface area with respect to the amount of said fine particles being not less than 0.35.

9 Claims, 10 Drawing Sheets

(x20000)

(x20000)

(x20000)

(x20000)

IRON OXIDE PARTICLES AND PROCESS FOR PRODUCING THE SAME

BACKGROUND OF THE INVENTION

The present invention relates to iron oxide particles. More particularly, the present invention relates to iron oxide particles which are capable of suppressing to the minimum the deterioration of a resin, for example, a resin containing chlorine in the molecular and colored with iron oxide particles, which is caused by the influence of the heat applied to the resin during processing or the light during exposure to the open air, and the gelation of such a resin which is caused during the process of producing a coating material; to iron oxide particles as magnetic particles for a magnetic toner which have an excellent fluidity; and to a method of producing such iron oxide particles.

With the rise of the level of recent life, commercial goods have been required to have not only improved functional qualities but also a good external appearance which suits customers' tastes and senses of beauty. With respect to colors, various colors are demanded. In order to satisfy such demand, for example, a coloring pigment is mixed and kneaded with a resin when resin moldings are produced, and a coloring pigment is mixed and dispersed in a vehicle when a coating material is produced.

However, it is widely known that the resin in molding articles produced from the resin and a coloring pigment mixed and kneaded therewith is deteriorated by the influence of the heat applied to the resin during processing or the light during exposure to the open air, and that the coating material produced from a vehicle and a coloring pigment dispersed therein gelates by the influence of the coloring pigment.

The typical coloring pigments which have been generally used are iron oxide particles. Hematite iron oxide particles are used as a reddish brown pigment, maghemite iron oxide particles are used as a brown pigment, and magnetite iron oxide particles are used as a black pigment. These iron oxide particles among all the pigments are especially known to accelerate the deterioration and the gelation of a resin. This fact is clear from the description at p. 56 of *The Journal of the Japan Society of Color Material*, vol 3, published by the Japan Society of Color Material: "The influence of a pigment on the thermal decomposition of commercially available styrene resin, methacryl resin and styrene-acrylonitrile resin during the molding process was investigated. As a result of further investigation of the cause of thermal decomposition, it was concluded that the thermal decomposition of each resin was caused by some metals contained in a pigment. It was found that pigments which contain iron, cadmium and the like (i.e., colcothar(hematite), cadmium red, cadmium yellow, etc.) comparatively accelerates the thermal decomposition of each of the these resins.

The deterioration of a resin containing chlorine will be explained below, citing a polyvinyl chloride resin which is typical of chlorine-containing resins, as an example.

Polyvinyl chloride resins, even if they are not colored with iron oxide particles, are decomposed and degenerated by the heat applied thereto during processing or the sun's light during exposure to the open air after they are molded into articles.

Such deterioration is produced because a part of chlorine bonding in a polyvinyl chloride resin is decomposed at 100° to 200° C. by the action of heat and generates hydrogen chloride, thereby forming a polyene structure having a double bonding, and further the hydrogen chloride generated secondarily acts on the resin itself, thereby cutting a part of C—C bonding in a polymer or producing a cross-linking as a chain reaction.

It is generally known that in order to suppress such deterioration, a neutralizer such as a lead compound and metallic soap for neutralizing the hydrogen chloride generated by decomposition or a resin stabilizer such as an organic tin compound and an epoxy compound which is effective in suppressing the generation of a double bonding is added to a polyvinyl chloride resin for an ordinary thermoforming material even when it is not colored by an iron oxide pigment.

As is known, since iron oxide particles accelerate the dehydrochlorination of a resin by the influence of Fe which is a component of the iron oxide particles, in the case of mixing as a coloring agent iron oxide particles with a polyvinyl chloride resin, the deterioration of the resin is greatly accelerated.

Iron oxide particles which are capable of suppressing the deterioration or the gelation of a resin to the minimum is therefore strongly demanded.

In order to suppress the deterioration or the gelation of a resin, a method of coating the surfaces of iron oxide particles with various inorganic or organic compounds so as to suppress the surface activity of the iron oxide particles is conventionally adopted. As a method of coating the surfaces of iron oxide particles with an inorganic compound, a method of forming a continuous silica film on the surfaces of iron oxide particles (Japanese Patent Publication (KOKOKU) No. 54- 7292 (1979)), a method of coating the surfaces of the iron oxide particles with glassy Na and/or K-Si (Japanese Patent Publication No. 53-11537 (1978)), a method of depositing $SiO_2$ on the surfaces of the iron oxide particles and further depositing aluminum hydroxide on the precipitated $SiO_2$ (Japanese Patent Application Laid-Open (KOKAI) No. 53-36538 (1978)), etc. are known. As a method of coating the surfaces of iron oxide particles with an organic compound, there is, for example, a method of kneading an organic compound having a hydrophobic group with the iron oxide particles by a wheel-type kneader or an attrition mill (Japanese Patent Application Laid-Open (KOKAI) No. 3-221965 (1991)).

Although iron oxide particles which are capable of suppressing the deterioration or the gelation of a resin to the minimum is now in the strongest demand, the above-described known iron oxide particles cannot be said to suppress the deterioration or the gelation of a resin sufficiently, because it is difficult to coat the surfaces of the iron oxide particles with inorganic fine particles uniformly, as will be shown in a later-described comparative examples.

On the other hand, a development process using, as a developer, composite particles which are produced by mixing and dispersing magnetic particles such as magnetite particles with a resin without using a carrier, in other words, what is called a one-component magnetic toner is well known and generally used as one of the electrostatic latent image development processes.

With the recent development of a high-speed copying machine, it is strongly demanded to enhance the fine line reproducibility, to improve the image quality such as the density of an image and the gradient. For this purpose, a magnetic toner which has an improved charging stability, an improved blackness or a large residual magnetization and an excellent fluidity has been demanded.

As to the fluidity of a magnetic toner, Japanese Patent Application Laid-Open (KOKAI) No. 53-94932 (1991)

describes, "Such a high-resistance magnetic toner has too low fluidity for even development due to its high resistance. That is, although a high-resistance toner for PPC can hold the necessary charge for transfer, since there is a slight amount of charge in the toner bottle, on the surface of a magnetic roll, etc. in the process other than the transfer process which needs no charge, due to the frictional charge or the mechanoerectret in the process of producing the toner, agglomeration is apt to be caused, which lowers the fluidity . . . ", and "Another object of the present invention is to provide a high-resistance toner for PPC having improved fluidity so as to produce a high-quality indirect photocopy free from uneven development and, hence, having excellent definition and gradient".

In order to obtain a magnetic toner having the above-described properties, it is necessary to satisfy one of the following requirements in accordance with the developing system:

(1) The residual magnetization of the magnetic particles is as low as possible so that the agglomerating force is small and the fluidity is excellent.

(2) The $Fe^{2+}$ content of the magnetic particles is large so that the blackness is high, in other words, the magnetic particles show a bluish black color and are excellent in the fluidity.

(3) The magnetic particles have a large residual magnetization and high fluidity.

In the case (1), a good toner is obtained as described in Japanese Patent Application Laid-Open (KOKAI) No. 3-122658 (1992), "Such a magnetic material has a small residual magnetization so that the agglomeration force is also small, which facilitates the production of a good image." As magnetic particles having a small residual magnetization, spherical spinel-type iron oxide particles have conventionally known. Due to the small residual magnetization, the agglomerating force is very small. The residual magnetization of magnetic particles has a close relationship with the particle size thereof. The smaller the particle size of the magnetic particles is, the larger the residual magnetization is apt to be. The relative value of residual magnetization of the spherical magnetic particles [(the area-average particle diameter)×(the measured residual magnetization)] is not more than 2 (μm·emu/g).

In the case (2), the blackness of the particles having a particle diameter of about 0.1 to 0.5 μm which are used for a magnetic toner is known to be dependent mainly on the $Fe^{2+}$ content. As the $Fe^{2+}$ content becomes large, the particles show a bluish black color, as described in *Journal of the Japan Society of Powder and Powder Metallurgy*, Vol. 26 (1979) page 240, "The blackness of the sample is dependent on the Fe(II) content and the average particle diameter, and particles having an average particle diameter of 0.2 μm show a bluish black color, and are the most suitable as a black pigment. . . . If the Fe(II) content is not less than 10 wt %, any of the samples has a black color although there is a slight difference in the blackness. When the Fe(II) content is reduced to less than 10 wt %, the color of each sample changes from black to reddish brown." As the magnetic particles having a high blackness, hexahedral spinel-type iron oxide particles are conventionally known. These particles have a larger $Fe^{2+}$ content of 0.3 to 0.5 in molar ratio based on the $Fe^{3+}$ content and, as a result, the blackness is high.

In the case of (3), as the magnetic particles having a high residual magnetization, octahedral spinel-type iron oxide particles are conventionally known. The residual magnetization of magnetic particles has a close relationship with the particle size thereof. The smaller the particle size of the magnetic particles is, the larger the residual magnetization is apt to be. The relative value of residual magnetization of the octahedral magnetic particles [(the area-average particle diameter)×(the measured residual magnetization)] is more than 2 (μm·emu/g).

In order to enhance the fluidity of a magnetic toner, attempts have been mainly made to subject the magnetic toner itself to some treatment. For example, (i) a method of kneading the fine particles of a silicon compound or the like, which is a fluidity modifier, with a resin, so that the fluidity modifier is contained in the surface or within the magnetic toner (Japanese Patent Application Laid-Open (KOKAI) Nos. 53-94932 (1978), 59-223451 (1984), 60-26953 (1985) and 2- 73362 (1990), and Japanese Patent Publication No. 4-21860 (1992), and (ii) a method of treating the surfaces of the particles of a magnetic toner with fine particles of a silicon compound or the like, which is a fluidity modifier (Japanese Patent Application Laid-Open (KOKAI) No. 63-8750 (1985)) are known.

On the other hand, as a method of treating the magnetic particles of a magnetic toner with a silicon compound, so that the silicon compound is present on the surfaces of the particles, for example, (iii) a method of adhering and bonding silica gel $SiO_2$-$nH_2O$ to the surfaces of the magnetic particles (Japanese Patent Application Laid-Open (KOKAI) No. 2-73362 (1990)), and (iv) a method of forming on the surfaces of the magnetic particles a neutralized silicate compound film (Japanese Patent Application Laid-Open (KOKAI) No. 57-201244 (1982)) are known.

However, the method (i) of containing in a magnetic toner a fluidity modifier is defective in that the fluidity modifier scales off and the fluidity thereof reduces with the passage of time, when magnetic toner particles comes into contact with another magnetic toner particles or with the sleeve, thereby lowering the fluidity with the passage of time.

In the method (ii), fine particles of the silicon compound as the fluidity modifier scales off the surface of the magnetic toner particles by the shock of the contact between the magnetic toner particles or between the magnetic toner particles and the sleeve when the magnetic toner is charged on the sleeve.

The object of the method (iii) is to improve of the environmental stability by suppressing the change in the amount of charge due to the change in the humidity by utilizing the water absorbing property and the water releasing property of the silica gel $SiO_2$-$nH_2O$ which is adhered and bonded to the surfaces of the magnetic particles so as to maintain the amount of charge at a constant value, but the improvement of the fluidity of the magnetic toner is insufficient, as shown in a later-described comparative example.

In the method (iv), since the neutralized silicate compound exists on the surfaces of the magnetic particles not in the form of fine particles but in the form of a film, the adhesion between the magnetic toner increases in comparison with that in which fine particles exist between the magnetic toner, so that it is impossible to improve a fluidity of the magnetic toner.

As a result of studies undertaken by the present inventors in order to eliminated the above-mentioned defects, it has been found that by adding or precipitating 0.25 to 10 parts by weight (calculated as an oxide) of the fine particles of the oxygen compound and/or the fine particles of the hydrate of the element selected from the group consisting of Al, Si, Zr and Ti to or onto 100 parts by weight of iron oxide particles having a specific surface area represented by the formula: $6/(\rho \cdot d_3) \times \phi_s$ [ρ represents a specific gravity of the iron oxide particles, $d_3$ represents an area-average particle diameter (0.1 µm≦$d_3$≦1.0 µm), and $\phi_s$ represents an area shape factor (1.0≦$\phi_s$≦2.0)], and mixing the iron oxide particles and the fine particles by compressing, shearing and spatula-stroking by in a wheel-type kneader, the obtained iron oxide particles with the fine particles of an oxygen compound and/or the fine particles of a hydrate of one element selected from the group consisting of Al, Si, Zr and Ti adhered to (deposited on) the surfaces thereof are capable of suppressing the deterioration or the gelation of a resin to the minimum, and that in case of using spherical, hexahedral or octahedral spinel-type iron oxide particles as the iron oxide particle to be treated, the obtained iron oxide particles with fine silica particles adhered to (deposited on) the surface thereof have an excellent fluidity and are useful as magnetic particles for a magnetic toner. The present invention has been achieved on the basis of these findings.

SUMMARY OF THE INVENTION

It is an object of the present invention to provide iron oxide particles which are capable of suppressing to the minimum the deterioration of a resin during processing or the gelation of a resin which is caused during the production of a coating material, and a process of industrially producing such iron oxide particles.

It is another object of the present invention to provide magnetic particles comprising iron oxide particles, for a magnetic toner which have as small a residual magnetization as possible and hence, a small magnetic agglomerating force, and an excellent fluidity, and a process of industrially producing such magnetic particles.

It is still another object of the present invention to provide magnetic particles comprising iron oxide particles, for a magnetic toner which have a high blackness and an excellent fluidity, and a process of industrially producing such magnetic particles.

It is a further object of the present invention to provide magnetic particles comprising iron oxide particles, for a magnetic toner which have a large residual magnetization and an excellent fluidity, and a process of industrially producing such magnetic particles.

To achieve this aim, in a first aspect of the present invention, there are provided iron oxide particles comprising:

100 parts by weight of iron oxide particles having a specific surface area represented by the following formula (1):

$$6/(\rho \cdot d_3) \times \phi_s \qquad (1)$$

wherein $\rho$ represents a specific gravity of the iron oxide particles, $d_3$ represents an area-average particle diameter (0.1 µm≦$d_3$≦1.0 µm), and $\phi_s$ represents an area shape factor (1.0≦$\phi_s$≦2.0); and 0.25 to 10 parts by weight (calculated as an oxide) of fine particles of an oxygen compound and/or the fine particles of a hydrate of one element selected from the group consisting of Al, Si, Zr and Ti, which are adhered to (deposited on) the surfaces of the iron oxide particles, the increment of the specific surface area being 1 to 6 m²/g, and the increment of the specific surface area with respect to the amount of the fine particles being not less than 0.35.

In a second aspect of the present invention, there are provided a pigment composed of iron oxide particles comprising:

100 parts by weight of iron oxide particles having a specific surface area represented by the following formula (1):

$$6/(\rho \cdot d_3) \times \phi_s \qquad (1)$$

wherein $\rho$ represents a specific gravity of the iron oxide particles, $d_3$ represents an area-average particle diameter (0.1 µm≦$d_3$≦1.0 µµm), and $\phi_s$ represents an area shape factor (1.0≦$\phi_s$≦2.0); and 0.25 to 10 parts by weight (calculated as an oxide) of fine particles of an oxygen compound and/or the fine particles of a hydrate of one element selected from the group consisting of Al, Si, Zr and Ti, which are adhered to (deposited on) the surfaces of the iron oxide particles, the increment of the specific surface area being 1 to 6 m²/g, and the increment of the specific surface area with respect to the amount of the fine particles being not less than 0.35.

In a third aspect of the present invention, there are provided a coating material comprising:

100 parts by weight of a pigment composed of iron oxide particles comprising: 100 parts by weight of iron oxide particles having a specific surface area represented by the following formula (1):

$$6/(\rho \cdot d_3) \times \phi s \qquad (1)$$

wherein $\rho$ represents a specific gravity of the iron oxide particles, $d_3$ represents an area-average particle diameter (0.1 µm≦$d_3$≦1.0 µm), and $\phi_s$ represents an area shape factor (1.0≦$\phi_s$≦2.0); and 0.25 to 10 parts by weight (calculated as an oxide) of fine particles of an oxygen compound and/or the fine particles of a hydrate of one element selected from the group consisting of Al, Si, Zr and Ti, which are adhered to (deposited on) the surfaces of the iron oxide particles, the increment of the specific surface area being 1 to 6 m²/g, and the increment of the specific surface area with respect to the amount of the fine particles being not less than 0.35;

100 to 10000 parts by weight of a thermoplastic resin as a binder; and not more than 10000 parts by weight of an organic solvent.

In a fourth aspect of the present invention, there are provided a resin composition comprising:

100 parts by weight of a pigment composed of iron oxide particles comprising: 100 parts by weight of iron oxide particles having a specific surface area represented by the following formula (1):

$$6/(\rho \cdot d_3) \times \phi_s \qquad (1)$$

wherein $\rho$ represents a specific gravity of the iron oxide particles, $d_3$ represents an area-average particle diameter (0.1 µm≦$d_3$≦1.0 µm), and $\phi_s$ represents an area shape factor (1.0≦$\phi_s$≦2.0); and 0.25 to 10 parts by weight (calculated as an oxide) of fine particles of an oxygen compound and/or the fine particles of a hydrate of one element selected from the group consisting of Al, Si, Zr and Ti, which are adhered to (deposited on) the surfaces of the iron oxide particles, the increment of the specific surface area being 1 to 6 m$^2$/g, and the increment of the specific surface area with respect to the amount of the fine particles being not less than 0.35; and 400 to 10000 parts by weight of a resin.

In a fifth aspect of the present invention, there are provided iron oxide particles as magnetic particles for a magnetic toner comprising:

100 parts by weight of spherical spinel-type iron oxide particles having a specific surface area represented by the following formula (2):

$$6/(\rho_1 \cdot d_{31}) \times \phi_{s1} \quad (2)$$

wherein $\rho_1$ represents a specific gravity of said spherical spinel-type iron oxide particles, $d_{31}$ represents an area-average particle diameter (0.1 µm$\leq d_{31} \leq$0.5 µm), and $\phi_{s1}$ represents an area shape factor (1.40$\leq \phi_{s1} \leq$1.60); and 0.5 to 3.5 parts by weight (calculated as SiO$_2$) of fine silica particles which are adhered to (deposited on) the surfaces of said spherical spinel-type iron oxide particles;

the increment of said specific surface area of said spherical spinel-type iron oxide particles being 1 to 5 m$^2$/g, and the increment of said specific surface area with respect to the amount of said fine silica particles being 1.0 to 4.5.

In a sixth aspect of the present invention, there are provided iron oxide particles as magnetic particles for a magnetic toner comprising:

100 parts by weight of hexahedral spinel-type iron oxide particles having a specific surface area represented by the following formula (3):

$$6/(\rho_2 \cdot d_{32}) \times \phi_{s2} \quad (3)$$

wherein $\rho_2$ represents a specific gravity of said hexahedral spinel-type iron oxide particles, $d_{32}$ represents an area-average particle diameter (0.1 µm$\leq d_{32} \leq$0.5 µm), and $\phi_{s2}$ represents an area shape factor (1.20$\leq \phi_{s2} <$1.40); and 0.5 to 3.5 parts by weight (calculated as SiO$_2$) of fine silica particles which are adhered to (deposited on) the surfaces of said hexahedral spinel-type iron oxide particles;

the increment of said specific surface area of said hexahedral spinel-type iron oxide particles being 1 to 5 m$^2$/g, and the increment of said specific surface area with respect to the amount of said fine silica particles being 1.0 to 4.5.

In a seventh aspect of the present invention, there are provided iron oxide particles as magnetic particles for a magnetic toner comprising:

100 parts by weight of octahedral spinel-type iron oxide particles having a specific surface area represented by the following formula (4):

$$6/(\rho_3 \cdot d_{33}) \times \phi_{s3} \quad (4)$$

wherein $\rho_3$ represents a specific gravity of said octahedral spinel-type iron oxide particles, $d_{33}$ represents an area-average particle diameter (0.1 µm$\leq d_{33} \leq$0.5 µµm), and $\phi_{s3}$ represents an area shape factor (1.60$<\phi_{s3} \leq$1.80); and 0.5 to 3.5 parts by weight (calculated as SiO$_2$) of fine silica particles which are adhered to (deposited on) the surfaces of said octahedral spinel-type iron oxide particles;

the increment of said specific surface area of said octahedral spinel-type iron oxide particles being 1 to 5 m$^2$/g, and the increment of said specific surface area with respect to the amount of said fine silica particles being 1.0 to 4.5.

In an eighth aspect of the present invention, there is provided a process for producing iron oxide particles defined in the first aspect, said method comprising the steps of:

adding or precipitating 0.25 to 10 parts by weight (calculated as an oxide) of said fine particles of said oxygen compound, said fine particles of said hydrate or mixed fine particles thereof of one element selected from the group consisting of Al, Si, Zr and Ti to or onto 100 parts by weight of iron oxide particles having a specific surface area represented by the following formula (1):

$$6/(\rho \cdot d_3) \times \phi_s \quad (1)$$

wherein $\rho$ represents a specific gravity of said iron oxide particles, $d_3$ represents an area-average particle diameter (0.1 µm$\leq d_3 \leq$1.0 µm) and $\phi_s$ represents an area shape factor (1.0$\leq \phi_s \leq$2.0); and mixing said material iron oxide particles and said fine particles by compressing, shearing and spatula-stroking in a wheel-type kneader, thereby producing iron oxide particles wherein the increment of said specific surface area of said iron oxide particles is 1 to 6 m$^2$/g, and the increment of said specific surface area with respect to the amount of said fine particles is not less than 0.35.

DETAILED DESCRIPTION OF THE INVENTION

Figure 1:
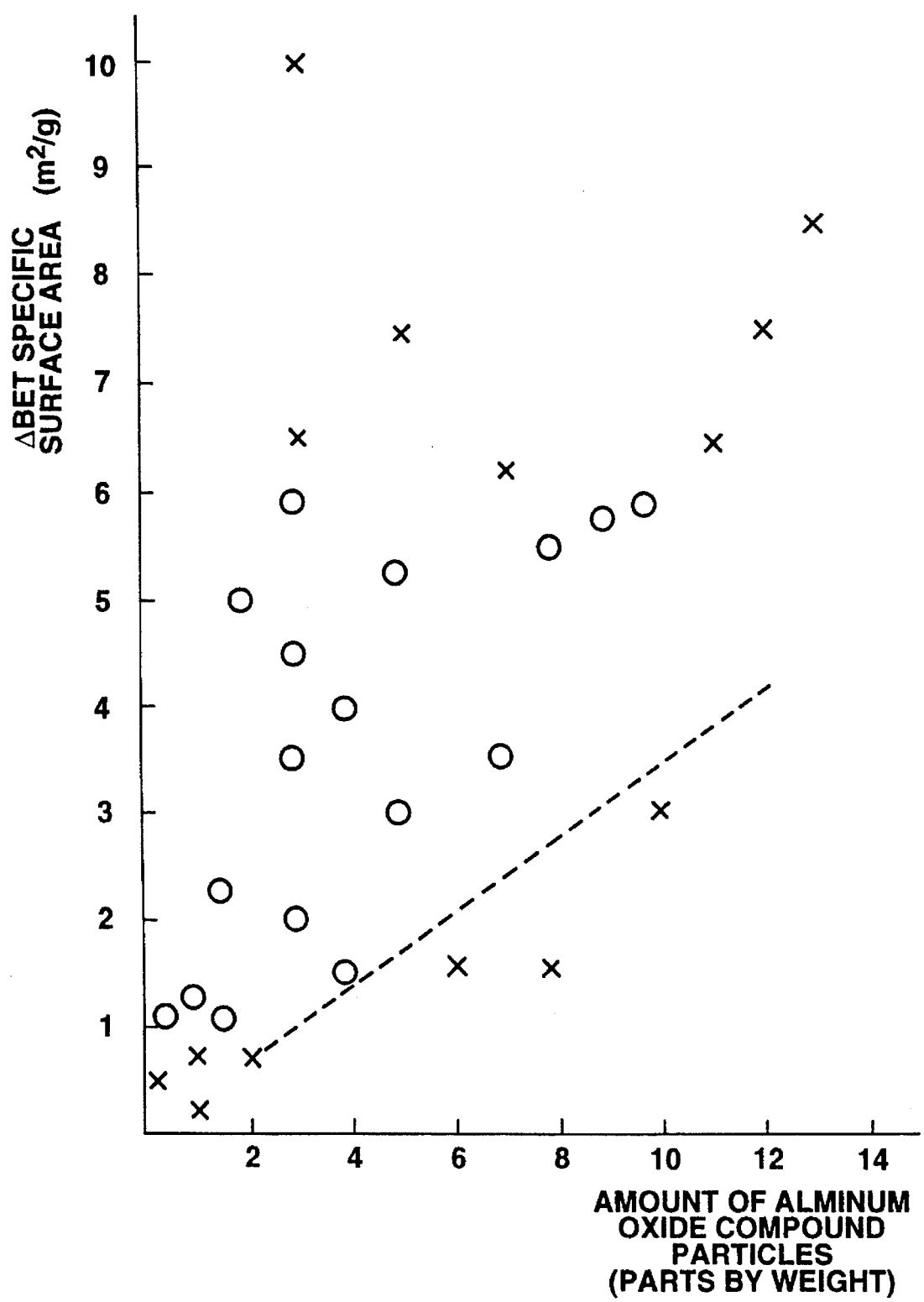
FIG. 1 shows the relationship between the amount of fine particles of an aluminum oxide compound used and the increment of the specific surface area of the iron oxide particles with the fine particles of the aluminum oxide compound adhered thereto.

The iron oxide particles provided in a first gist of the present invention which are capable of suppressing to the minimum the deterioration of a resin during processing or the gelation of a resin which is caused during the production of a coating will now be explained.

The iron oxide particles as the particles to be treated in the present invention are hematite particles, magnetite particles ($FeO_x \cdot Fe_2O_3$, $0 < x \leq 1$), maghemite particles or particles composed of these particles and an element contained therein such as Mn, Ni, Co, Cu, Zn and Mg other than Fe. These particles may be obtained by any ordinary method. As the most typical method of producing these particles, a method of producing magnetite particles by what is called a wet process, namely, by blowing an oxygen-containing gas such as air into a suspension containing precipitated iron such as $Fe(OH)_2$ obtained by reacting an aqueous ferrous solution with an aqueous alkali such as alkali hydroxide and alkali carbonate, heating the magnetite particles at a temperature of 200° to 400° C. in the air to produce maghemite particles, and further heating the obtained maghemite particles at a temperature of 300° to 700° C. in the air to produce hematite particles, is widely known. The particle shape is what is called isostatic particulate i.e., granular such as cubic, hexahedral, octahedral, polyhedral and irregular shape, and the surfaces of the particles may be either smooth or rough.

The area shape factor $\phi_s$ ($1.0 \leq \phi_s \leq 2.0$) in the formula (1) is defined as follows. The area-average particle diameter ($d_3$) was calculated from the Martin diameter of a projected particle, and the surface area ($S_s$) was obtained from the formula: $Ss = 6/\rho \cdot d_3$ ($\rho$ represents a specific gravity of the iron oxide particles). Separately, the BET specific surface area of the iron oxide particles was measured, and as the coefficient for correcting the difference in both surface areas, the area shape factor $\phi_s$ was defined. The area shape factor obtained by measuring spherical magnetite particles (0.1 to 0.3 μm in diameter), hexahedral magnetite particles (0.15 to 0.3 μm in diameter) and octahedral magnetite particles (0.1 to 0.3 μm in diameter) produced by the present inventors according to the above-described method are as follows.

Since the area shape factor of a completely spherical particle is $\phi_s = 1.0$, on the basis of this, the area shape factor of an irregular-shape particle is represented as $1.0 < \phi_s < 1.2$, that of a cubic or hexahedral particle as $1.2 \leq \phi_s < 1.4$, that of a spherical particle as $1.4 \leq \phi_s \leq 1.6$, and that of an octahedral particle as $1.6 < \phi_s \leq 1.8$.

The particle size of the iron oxide particles to be treated is 0.1 to 1.0 μm. If the particle size is less than 0.1 μm, the agglomerating force between the particles is so large that the dispersibility is low and it is difficult to adhere the fine particles of an oxygen compound and/or the fine particles of a hydrate of a specific element to the surfaces of the iron oxide particles, thereby making it impossible to produce the effect intended in the present invention. If the particle size exceeds 1.0 μm, it is so large as lower the tinting strength, so that the pigment is not favorable as a coloring pigment.

The fine particles of an oxide compound of a specific element are the fine particles of an oxide, a hydroxide, a hydroxide oxide, a hydrous oxide and a mixture thereof of the specific element.

As an Al oxide compound, $Al_2O_3$, $AlO(OH)$, $Al(OH)_3$, etc. are usable. An Al hydroxide are generally represented by $Al_2O_3 \cdot nH_2O$.

As an Si oxide compound, $SiO_2$, $SiO(OH)_4$, etc. are usable. An Si hydroxide are generally represented by $SiO_2 \cdot nH_2O$.

As a Zr oxide compound, $ZrO_2$, $ZrO(OH)_4$, etc. are usable. A Zr hydroxide are generally represented by $ZrO_2 \cdot nH_2O$.

As a Ti oxide compound, $TiO_2$, $TiO(OH)_2$, $Ti(OH)_4$, etc. are usable. A Ti hydroxide are generally represented by $TiO_2 \cdot nH_2O$.

The fine particles of an oxygen compound and/or the fine particles of a hydrate of a specific element in the present invention are directly added to the iron oxide particles to be treated (dry process). Alternately, the oxygen compound and/or the hydrate of the specific element is added in a suspension with the iron oxide particles dispersed therein, and thereafter an aqueous alkali or acidic solution is added to the resultant suspension so as to precipitate the fine particles of the oxygen compound and/or the fine particles of the hydrate of the specific element (wet process).

The amount of fine particles of an oxygen compound and/or the fine particles of a hydrate of a specific element in the present invention is 0.25 to 10 parts by weight (calculated as an oxide) based on 100 parts by weight of the iron oxide particles to be treated. If the amount is less than 0.25 part by weight, the density of the fine particles of an oxygen compound and/or the fine particles of a hydrate of a specific element adhered to the surfaces of the iron oxide particles is too low to sufficiently suppress the surface activity of the iron oxide particles. If the amount exceeds 10 parts by weight, since the tinting strength of the iron oxide particles is lowered, it is necessary to increase the amount of iron oxide particles kneaded with a resin, so that it is difficult to suppress the deterioration and the gelation of the resin. When the uniform and dense deposition of the fine particles of an oxygen compound and/or the fine particles of a hydrate of a specific element, and the tinting strength of the iron oxide particles are taken into consideration, the amount of the fine particles of an oxygen compound and/or the fine particles of hydrate of the specific element is preferably 0.5 to 8 parts by weight, more preferably 1.0 to 5 parts by weight based on 100 parts by weight of the iron oxide particles to be treated.

The increment (ΔBET) of the specific surface area of the iron oxide particles of the present invention is 1 to 6 m²/g. If the increment of the specific surface area is less than 1 m²/g, the amount of fine particles of an oxygen compound and/or the fine particles of a hydrate of a specific element, adhered to the surfaces of the iron oxide particles is so small that the suppression of the surface activity of the iron oxide particles is insufficient. On the other hand, if it exceeds 6 m²/g, the kneading by a wheel-type kneader is insufficient so that those fine particles locally exist on the surfaces of the iron oxide particles, which leads to the insufficient suppression of the surface activity of the iron oxide particles. In addition, due to the increase of the fine particles of an oxygen compound and/or a hydrate of a specific element which do not contribute to the enhancement of the tinting strength, the tinting strength of the iron oxide particles is greatly lowered. If the uniform and dense deposition of the fine particles of an oxygen compound and/or a hydrate of a specific element is taken into consideration, the increment of the specific surface area is preferably 2 to 6 m$^2$/g, more preferably 2 to 5 m$^2$/g.

The increment of the specific surface area of the iron oxide particles with respect to the amount of fine particles of a specific element is not less than 0.35, preferably not less than 0.5. If it is less than 0.35, the particle size of the fine particles of a specific element is larger than that of the iron oxide particles, so that the uniform and dense deposition of the fine particles of the specific element on the surfaces to the iron oxide particles is difficult, thereby making it impossible to produce the effect of the present invention.

In order to improve the dispersibility when the iron oxide particles of the present invention are kneaded and mixed with a resin, the iron oxide particles may be treated with a coupling agent such as a titanium coupling agent and a silane coupling agent, a surfactant or the like so as to make the iron oxide particles hydrophobic.

The iron oxide particles of the present invention are produced by adding or precipitating 0.25 to 10 parts by weight (calculated as an oxide) of the fine particles of an oxygen compound and/or a hydrate of an element selected from the group consisting of Al, Si, Zr and Ti to or onto 100 parts by weight of iron oxide particles having a specific surface area represented by the formula: $6/(\rho \cdot d_3) \times \phi_s$ [$\rho$ represents an specific gravity of the iron oxide particles, $d_3$ represents an area-average particle diameter (0.1 μm$\leq d_3 \leq$ 1.0 μm) and $\phi_s$ represents an area shape factor (1.0$\leq \phi_s \leq$2.0)], and mixing the iron oxide particles and the fine particles by compressing, shearing and spatula-stroking in a wheel-type kneader.

It is possible to obtain the iron oxide particles in which the increment of the specific surface area is 1 to 6 m$^2$/g by compressing, shearing and spatula-stroking the fine particles of the specific element and the iron oxide particles by using a wheel-type kneader. With due consideration of the aim of the present invention, a line load of wheel-type kneader is not less than 30 kg/cm, preferably not less than 50 kg/cm.

As the wheel-type kneader, Simpson mix muller, Multimill, Storz mill, Back flow mixer, Irich mill, etc. are usable, but Wet pan mill, Melanger, Whirl mill and Quick mill cannot produce the iron oxide particles in which the increment of the specific surface area is 1 to 6 m$^2$/g because the latter kneaders such as Wet pan mill, Melanger, Whirl mill and Quick mill have only compressing and spatula-stroking actions and no shearing action.

What is the most important in the present invention is that the iron oxide particles with the fine particles of an oxygen compound and/or a hydrate of a specific element adhered to the surfaces thereof which are produced by adding or precipitating 0.25 to 10 parts by weight (calculated as an oxide) of the fine particles of the oxygen compound and/or the fine particles of the hydrate of the specific element to or onto 100 parts by weight of iron oxide particles having a specific surface area represented by the formula: $6/(\rho \cdot d_3) \times \phi_s$ [$\rho$ represents a specific gravity of the iron oxide particles, $d_3$ represents an area-average particle diameter (0.1 μm$\leq d_3 \leq$1.0 μm), and $\phi_s$ represents an area-shape factor (1.0$\leq \phi_s \leq$2.0)], and mixing the iron oxide particles and the fine particles by compressing, shearing and spatula-stroking in a wheel-type kneader, and in which the increment of the specific surface area between the iron oxide particles with the fine particles of an oxygen compound and/or the fine particles of a hydrate of the specific element and the iron oxide particles to be treated as a raw material is 1 to 6 m$^2$/g, and the increment of the specific surface area with respect to the amount of fine particles is not less than 0.35, are capable of suppressing the deterioration or the gelation of a resin to the minimum, as will be described in later-described Examples.

The reason why the iron oxide particles of the present invention are capable of suppressing the deterioration or the gelation of a resin to the minimum is considered as follows. When the fine particles and the iron oxide particles are kneaded by a wheel-type kneader in accordance with the present invention, the fine particles of an oxide compound and/or a hydrate of a specific element which are existent between the iron oxide particles are pressed against the surfaces of the iron oxide particles and the intervals between the particles are enlarged so as to increase the adhesion of the fine particles with the surfaces of the iron oxide particles by the compressing action. The fine particles of the oxygen compound and/or the hydrate of the specific element existent on the surfaces of the iron oxide particles and the iron oxide particles are discretely deagglomerated by the shearing action. Further, the fine particles of an oxygen compound and/or a hydrate of a specific element existent on the surfaces of the iron oxide particles and the iron oxide particles are uniformly spread by the spatula-stroking action. By repeating these three actions in the kneader, the iron oxide particles are deagglomerated, so that the iron oxide particles are present in a discrete state without re-agglomeration and, in addition, the fine particles of an oxygen compound and/or a hydrate of a specific element are adhered to the surface of each iron oxide particle uniformly and densely.

As will be shown in later-described Comparative Examples, a Henschel mixer which is generally used for the surface treatment of iron oxide particles, belongs to a blade-type kneader and since it has only a stirring action, use of a Henschel mixer does not produce the effect of the present invention.

The increment of the specific surface area of the iron oxide particles of the present invention will be explained with reference to FIG. 1.

FIG. 1 shows the relationship between the amount of fine particles of an aluminum oxide compound used and the increment of the specific surface area of the iron oxide particles with the fine particles of the aluminum oxide compound adhered thereto, namely, the difference (ΔBET) between the specific surface area of the iron oxide particles with the fine particles of the aluminum oxide compound adhered thereto and that of the iron oxide particles before the fine particles are adhered thereto while the line load of a Simpson mix muller is varied.

In other words, FIG. 1 shows the relationship between the amount of the fine particles of an aluminum oxide compound used and the increment of the specific surface area of the iron oxide particles with the fine particles of the aluminum oxide compound adhered thereto obtained in the same way as in later-described Example 1 except for varying the amount of fine particles of the aluminum oxide compound and the line load of the Simpson mix muller. In FIG. 1, the iron oxide particles ranked with "o" were capable of suppressing the deterioration or the gelation of a resin to the minimum. It was confirmed that in these iron oxide particles, the increment of the specific surface area of the iron oxide particles with the fine particles of the aluminum oxide compound adhered thereto was 1 to 6 $m^2/g$, and that the specific surface area with respect to the amount of fine particles is not less than 0.35. In FIG. 1, the iron oxide particles ranked with "x" were insufficient in suppressing the deterioration or the gelation of a resin to the minimum. It was confirmed that in these iron oxide particles, the increment of the BET specific surface area of the iron oxide particles with the fine particles of the aluminum oxide compound adhered thereto was less than 1 $m^2/g$ or more than 6 $m^2/g$, and that the BET specific surface area with respect to the amount of fine particles is less than 0.35.

In FIG. 1, the broken line is the line on which the BET specific surface area with respect to the amount of fine particles is 0.35.

The iron oxide particles of the present invention have fine particles of an oxygen compound and/or a hydrate of a specific element selected from the group consisting of Al, Si, Zr and Ti uniformly and densely adhered to the surfaces thereof, so that the iron oxide particles can suppress the surface activity of themselves and, hence, are capable of suppressing the deterioration or the gelation of a resin to the minimum. Thus the iron oxide particles of the present invention is suitable as pigment particles.

The iron oxide particles of the present invention are suitable as pigment for a coating material including ink, and pigment for a resin molding articles.

A coating material of the present invention is produced by adding the iron oxide particles of the present invention and, if necessary, an organic solvent to a resin and uniformly mixing them. The resin used in the coating material is not specified, and any known coating resin is usable, for example, acrylic based resin, acylate-melamine based resin, vinyl polyvinyl chloride-acetate copolymer, alkyd based resin, polyester, polyurethane and amino based resin. The organic solvent used in the coating material is not specified, and any known organic solvent for a coating material is usable, for example, toluene, xylene, butyl acetate, methyl ethyl ketone, isobutyl ketone, acetone, methanol, ethanol, butanol and cyclohexane. The mixing ratio of the coating material is 100 parts by weight of the iron oxide particles, 100 to 10,000 parts by weight, preferably 1,000 to 10,000 parts by weight of the resin and not more than 10,000 parts by weight, preferably not more than 5,000 parts by weight of the organic solvent.

A resin molding article using the iron oxide particles of the present invention is produced by adding the iron oxide particles of the present invention and an auxiliary agent (e.g., calcium carbonate) and, if necessary, a curing agent to a resin, kneading the resultant mixture and molding the kneaded mixture. The resin used in the molding article is not specified, and any known resin for a molding article is usable, for example, polyvinyl chloride, polyethylene, polypropylene, polyester and unsaturated polyester. The mixing ratio of the resin is 10 to 10,000 parts by weight, preferably 100 to 5,000 parts by weight based on 100 parts by weight of the iron oxide particles.

The magnetic particles for a magnetic toner provided in a second gist of the present invention, which have a high excellent fluidity and which are composed of (1) spherical spinel-type ferrite particles, (2) hexahedral spinel-type ferrite particles, and (3) octahedral spinel-type ferrite particles will now be explained.

(1) Spherical spinel-type ferrite particles

The particle shape of the spherical spinel-type ferrite particles as the particles to be treated in the present invention naturally includes a completely spherical shape but may also be slightly deformed only if it is approximately isostatic and a curved surface as a whole without any corner when observed through a transmission electron microscope. The surfaces of the particles may be either smooth or rough. In other words, the particles having an area shape factor of $1.40 \leq \phi_{s1} \leq 1.60$ may be used as the spherical spinel-type ferrite particles.

The area shape factor of $1.40 \leq \phi_{s1} \leq 1.60$ is obtained from the values of the specific surface areas of a large number of particles which are recognized to be in the range of the spherical particles defined above. Since the area shape factor of completely spherical particles is $\phi_s = 1.0$, on the basis of this area shape factor, the area shape factor of the spherical particles is represented as $1.40 \leq \phi_{s1} \leq 1.60$.

As the spherical spinel-type ferrite particles, the known particles are usable. The relative value of residual magnetization of the spherical magnetic particles [(the area-average particle diameter)×(the measured residual magnetization)] is not more than 2 µm·emu/g, preferably not more than 1.5 µm·emu/g.

(2) Hexahedral spinel-type ferrite particles

The particle shape of the hexahedral spinel-type ferrite particles as the particles to be treated in the present invention may be slightly deformed only if it is approximately cubic when observed through a transmission electron microscope. The surfaces of the particles may be either smooth or rough. In other words, the particles having an area shape factor of $1.20 \leq \phi_{s2} < 1.40$ may be used as the hexahedral spinel-type ferrite particles.

The area shape factor of $1.20 \leq \phi_{s2} < 1.40$ is obtained from the values of the specific surface areas of a large number of particles which are recognized to be in the range of the hexahedral particles defined above. Since the area shape factor of completely spherical particles is $\phi_s = 1.0$, on the basis of this area shape factor, the area shape factor of the hexahedral particles is represented as $1.20 \leq \phi_{s2} < 1.40$.

The $Fe^{2+}$ content (molar ratio) of the hexahedral spinel-type ferrite particles in the present invention is 0.3 to 0.5 based on the $Fe^{3+}$ content.

(3) Octahedral spherical spinel-type ferrite particles

The particle shape of the octahedral spinel-type ferrite particles as the particles to be treated in the present invention may be slightly deformed only if it is a shape of two pyramids with the bottom surfaces bonded to each other or a similar shape when observed through a scanning electron microscope. The surfaces of the particles may be either smooth or rough. In other words, the particles having an area shape factor of $1.60 \leq \phi_{s3} \leq 1.80$ may be used as the octahedral spinel-type ferrite particles.

The area shape factor of $1.60 < \phi_{s3} \leq 1.80$ is obtained from the values of the specific surface areas of a large number of particles which are recognized to be in the range of the octahedral particles defined above. Since the area shape factor of completely spherical particles is $\phi_s = 1.0$, on the basis of this area shape factor, the area shape factor of the octahedral particles is represented as $1.60 < \phi_{s3} \leq 1.80$.

The spherical, hexahedral and octahedral spinel-type iron oxide particles used in the present invention are magnetite particles ($FeO_x \cdot Fe_2O_3$, $0 < x \leq 1$), maghemite particles or ferrite particles containing a divalent metal other than Fe (at least one selected from the group consisting of Mn, Ni, Zn, Cu, Mg and Co). Any of these particles can produce the effect intended in the present invention.

The particle size of the spherical spinel-type iron oxide particles, hexahedral spinel-type iron oxide particles and octahedral spinel-type iron oxide particles in the present invention is preferably 0.1 to 0.5 µm. If the particle size is less than 0.1 µm, the agglomerating force between the particles may be so large that the dispersibility may be low and it is difficult to deposit fine silica particles on the surfaces of the magnetic particles. If the particle size exceeds 0.5 µm, although it is possible to adhere fine silica particles to the surfaces of the magnetic particles, concentration distribution of the magnetic particles may be caused in or on the magnetic toner, or between the magnetic toner, which deteriorates the image quality. Such particles are not favorable for a magnetic toner.

The fine silica particles used in the present invention are represented by the general formula: $(SiO_2)n$, and commercially available colloidal silica or hydrophobic fine silica powder may be used.

The BET specific surface area of the fine silica particles is preferably 100 to 450 $m^2/g$. If it is less than 100 $m^2/g$, it is difficult to improve the fluidity of the magnetic particles themselves and, hence, the fluidity of the magnetic toner. On the other hand, if it exceeds 450 $m^2/g$, the water absorption of the magnetic particles in the atmosphere of a high temperature and a high humidity may increase, so that the fluidity of the magnetic particles themselves and, hence, the fluidity of the magnetic toner may be lowered. From the point of view of the fluidity of the magnetic particles, the BET specific surface area is more preferably 150 to 400 $m^2/g$.

The mixing ratio of the fine silica particles with the spherical spinel-type iron oxide particles, the hexahedral spinel-type iron oxide particles or the octahedral spinel-type iron oxide particles is preferably 0.5 to 3.5 parts by weight, more preferably 1.0 to 3.0 by weight based on 100 parts by weight of the spherical spinel-type iron oxide particles, the hexahedral spinel-type iron oxide particles or the octahedral spinel-type iron oxide particles. If the mixing ratio of the fine silica particles is less than 0.5 part by weight, it is difficult to improve the fluidity of the magnetic particles themselves and, hence, the fluidity of the magnetic toner. On the other hand, if it exceeds 3.5 parts by weight, the water absorption of the magnetic particles in the atmosphere of a high temperature and a high humidity may increase, so that the fluidity of the magnetic toner is lowered. In addition, the increase in the amount of fine silica particles which do not contribute to the magnetic properties causes the lowering of not only the magnetization of the magnetic particles but also the magnetization of the magnetic toner.

The increment ($\Delta BET$) of the specific surface area of the magnetic particles of the present invention is preferably 1 to 5 $m^2/g$. If the increment of the specific surface area is less than 1 $m^2/g$, the fluidity of the magnetic particles themselves and, hence, the fluidity of the magnetic toner are not improved. On the other hand, if it exceeds 5 $m^2/g$, the water absorption of the magnetic particles in the atmosphere of a high temperature and a high humidity may increase, so that the fluidity of the magnetic particles themselves and, hence, the fluidity of the magnetic toner may be lowered. From the point of view of the fluidity of the magnetic particles and the magnetic toner, the increment of the specific surface area is more preferably 2 to 4 $m^2/g$.

The increment of the specific surface area of the spherical spinel-type iron oxide particles, the hexahedral spinel-type iron oxide particles or the octahedral spinel-type iron oxide particles of the present invention with respect to the amount of fine silica particles ($\Delta BET$/(amount of fine silica particles) ratio) is preferably 1.0 to 4.5, more preferably 1.2 to 4.0. If it is less than 1.0, the number of fine silica particles which deposit on the magnetic particles reduces, so that the uniform and dense deposition of the fine silica particles on the surfaces of the magnetic particles may be difficult, thereby making it difficult to produce the effect of the present invention. If it exceeds 4.5, the water absorption of the magnetic particles in the atmosphere of a high temperature and a high humidity may increase, so that the fluidity of the magnetic particles themselves and, hence, the fluidity of the magnetic toner may be lowered.

In order to improve the dispersibility when the magnetic particles of the present invention are kneaded and mixed with a resin, the magnetic particles may be treated with a coupling agent such as a titanium coupling agent and a silane coupling agent, a surfactant or the like so as to make the iron oxide particles hydrophobic.

The magnetic particles of the present invention are produced by adding 0.5 to 3.5 parts by weight of fine silica particles to (1) 100 parts by weight of spherical spinel-type iron oxide particles having a specific surface area represented by the formula: $6/(\rho 1 \cdot d_{31}) \times \phi_{s1}$ [$\rho 1$ represents a specific gravity of the spinel-type iron oxide particles, $d_{31}$ represents an area-average particle diameter($0.1\ \mu m \leq d_{31} \leq 0.5\ \mu m$), $\phi_{s1}$ represents an area shape factor ($1.40 \leq \phi_{s1} \leq 1.60$)], (2) 100 parts by weight of hexahedral spinel-type iron oxide particles having a specific surface area represented by the formula: $6/(\rho 2 \cdot d_{32}) \times \phi_{s2}$ [$\rho 2$ represents a specific gravity of the spinel-type iron oxide particles, $d_{32}$ represents an area-average particle diameter ($0.1\ \mu m \leq d_{32} \leq 0.5\ \mu m$), $\phi_{s2}$ represents an area shape factor ($1.20 \leq \phi_{s2} \leq 1.40$)], or (3) 100 parts by weight of octahedral spinel-type iron oxide particles having a specific surface area represented by the formula: $6/(\rho 3 \cdot d_{33}) \times \phi_{s3}$ [$\rho 3$ represents a specific gravity of the spinel-type iron oxide particles, $d33$ represents an area-average particle diameter ($0.1\ \mu m \leq d_{33} \leq 0.5\ \mu m$), $\phi_{s3}$ represents an area shape factor ($1.60 \leq \phi_{s3} \leq 1.80$)], and mixing the spinel-type iron oxide particles and the fine particles by compressing, shearing and spatula-stroking in a wheel-type kneader.

It is possible to obtain the spherical spinel-type iron oxide particles, the hexahedral spinel-type iron oxide particles or the octahedral spinel-type iron oxide particles in which the increment of the specific surface area is 1 to 5 $m^2/g$ by mixing the fine silica particles and the spinel-type iron oxide particles by using a wheel-type kneader. With due consideration of the aim of the present invention, a line load of not less than 30 kg/cm, preferably not less than 40 kg/cm, more preferably not less than 45 kg/cm is applied to the wheel-type kneader. As the Wheel-type kneader, Simpson mix muller, Multimill, Stotz mil, Back flow mixer, Irich mill, etc. are usable, but Wet pan mill, Melanger, Whirl mill and Quick mill cannot produce the spherical spinel-type iron oxide particles, the hexahedral spinel-type iron oxide particles or the octahedral spinel-type iron oxide particles in which the increment of the specific surface area is 1 to 5 $m^2/g$, because the latter kneaders such as Wet pan mill, Melanger, Whirl mill and Quick mill have only compressing and spatula-stroking actions and no shearing action.

Although a method of kneading magnetic particles and an organic compound by a Wheel-type kneader or Attrition mill in order to coat the surfaces of the magnetic particles with the organic compound is disclosed (Japanese Patent Application Laid-Open (KOKAI) No. 3-22196(1991)), this method is aimed to improve the degree of mixing of the magnetic particles with the resin by reducing the liquid absorption of the magnetic particles, and the object and the constitution of this method are different from those of the present invention which aims at the improvement of the fluidity of magnetic particles. Further, there is not motivated in the above-mentioned KOKAI No. 3-22196 the improvement of the fluidity of the magnetic particles of the present invention and the constitution of the iron oxide particles of the present invention.

What are the most important in the present invention are that (1) the spherical spinel-type iron oxide particles with fine silica particles adhered to the surface thereof, which are produced by mixing 0.5 to 3.5 parts by weight (calculated as $SiO_2$) of fine silica particles with 100 parts by weight of spherical spinel-type iron oxide particles having a specific surface area represented by the formula: $6/(\rho 1 \cdot d_{31}) \times \phi_{s1}$ [$\rho 1$ represents a specific gravity of the spinel-type iron oxide particles, $d_{31}$ represents an area-average particle diameter (0.1 µm $\leq d_{31} \leq$ 0.5 µm), $\phi_{s1}$ represents an area shape factor (1.40 $\leq \phi_{s1} \leq$ 1.60)], and in which the increment between the BET specific surface area of the spherical spinel-type iron oxide particles with fine silica particles adhered to the surface thereof and the specific surface area of the spherical spinel-type iron oxide particles to be treated as a raw material is 1 to 5 $m^2/g$, and the increment of the specific surface area with respect to the amount of the fine particles is 1.4 to 4.5, have an excellent fluidity, (2) the hexahedral spinel-type iron oxide particles with fine silica particles adhered to the surface thereto which are produced by mixing 0.5 to 3.5 parts by weight (calculated as $SiO_2$) of fine silica particles with 100 parts by weight of hexahedral spinel-type iron oxide particles having a specific surface area represented by the formula: $6/(\rho 2 \cdot d_{32}) \times \phi_{s2}$ [$\rho 2$ represents a specific gravity of the spinel-type iron oxide particles, $d_{32}$ represents an area-average particle diameter (0.1 µm $\leq d_{32} \leq$ 0.5 µm), $\phi_{s2}$ represents an area shape factor (1.20 $\leq \phi_{s2} \leq$ 1.40)], and in which the increment between the BET specific surface area of the hexahedral spinel-type iron oxide particles with fine silica particles adhered to the surface thereof and the specific surface area of the hexahedral spinel-type iron oxide particles to be treated as a raw material is 1 to 5 $m^2/g$, and the increment of the specific surface area with respect to the amount of the fine particles is 1.4 to 4.5, have an excellent fluidity, and (3) the octahedral spinel-type iron oxide particles with fine silica particles adhered to the surface thereto which are produced by mixing 0.5 to 3.5 parts by weight (calculated as $SiO_2$) of fine silica particles with 100 parts by weight of octahedral spinel-type iron oxide particles having a specific surface area represented by the formula: $6/(\rho 3 \cdot d_{33}) \times \phi_{s3}$ [$\rho 3$ represents a specific gravity of the spinel-type iron oxide particles, $d_{33}$ represents an area-average particle diameter (0.1 µm $\leq d_{33} \leq$ 0.5 µm), $\phi_{s3}$ represents an area shape factor (1.60 $< \phi_{s3} \leq$ 1.80)], and in which the increment between the BET specific surface area of the octahedral spinel-type iron oxide particles with fine silica particles adhered to the surface thereof and the specific surface area of the octahedral spinel-type iron oxide particles to be treated as a raw material is 1 to 5 $m^2/g$, and the increment of the specific surface area with respect to the amount of the fine particles is 1.4 to 4.5, have an excellent fluidity.

The spherical, hexahedral or octahedral spinel-type iron oxide particles of the present invention have an excellent fluidity and the flowability of the spherical, hexahedral or octahedral spinel-type iron oxide particles is not less than 55, preferably not less than 60, most preferably not less than 65.

The fluidity of the magnetic toner produced from the spherical, hexahedral or octahedral spinel-type iron oxide particles of the present invention is also excellent and the flowability of the magnetic toner particles is not less than 80, preferably not less than 85.

The reason why the spherical, hexahedral or octahedral spinel-type iron oxide particles of the present invention have an excellent fluidity is considered as follows. When increment of the specific surface area between the spherical, hexahedral or octahedral spinel-type iron oxide particles with the fine silica particles adhered thereto and the iron oxide particles before the fine silica particles are adhered thereto is in a specific range (1 to 5 $m^2/g$), and the increment of BET specific surface area therebetween with respect to the amount of fine silica particles adhered thereto is in a specific range (1 to 4.5), a large amount of silicon fine particles are uniformly distributed on the surfaces of the spherical, hexahedral or octahedral spinel-type iron oxide particles, and firmly adhered thereto, as will be shown in later-described Examples and Comparative Examples. When a magnetic toner is produced from such spherical, hexahedral or octahedral spinel-type iron oxide particles having an improved fluidity, a problem such as insufficient kneading and re-agglomeration of the magnetic particles is unlikely to be caused in the process of kneading the magnetic particles with the resin at the time of production of the toner. A large amount of magnetic particles, therefore, uniformly protrude from the surfaces of the particles of the magnetic toner and, as a result, a large amount of fine silica particles existent on the surfaces of the spherical, hexahedral or octahedral spinel-type iron oxide particles are uniformly distributed on the surface of the magnetic toner and are unlikely to drop off. In this way, the fluidity of the magnetic toner itself is improved.

As will be shown in later-described Comparative Examples, since a Henschel mixer which is generally used for mixing fine silica particles with spinel-type iron oxide particles, belongs to a blade-type kneader and has only a stirring action, use of a Henschel mixer does not produce the effect of the present invention.

The magnetization of the spherical, hexahedral or octahedral spinel-type iron oxide particles of the present invention is not less than 75 emu/g, preferably not less than 80 emu/g.

The spherical, hexahedral or octahedral spinel-type iron oxide particles of the present invention are useful as magnetic particles for a magnetic toner.

A magnetic toner produced from the spherical hexahedral or octahedral spinel-type iron oxide particles of the present invention is obtained by mixing the iron oxide particles with a resin. A low-molecular resin such as polyethylene, polypropylene may be added, if necessary, as an additive.

The resin used in the present invention is not restricted, and known binder resins for a magnetic toner are usable. Examples of such resins are styrene-acrylate copolymer, styrene-butylacrylate copolymer, polystyrene, polyvinyl chloride, phenol resin, epoxy resin, polyacrylate, polyester, polyethylene and polypropylene. The mixing ratio of the resin is 100 to 900 parts by weight, preferably 100 to 400 parts by weight based on 100 parts by weight of the iron oxide particles.

The magnetic toner of the present invention may contain coloring agent, plasticizer, surface lubricant, antistatic agent, etc. in the range which does not deteriorate the dispersibility of the magnetic particles in the low-molecular binder resin.

In producing the magnetic toner of the present invention, known methods (e.g., a method disclosed in Japanese Patent Application Laid-Open (KOKAI) No. 2-80 (1990) corresponding to U.S. Pat. No. 5,066,558 and Japanese Patent Application Laid-Open (KOKAI) No. 2-181757 (1990)) may be adopted.

The particle diameter of the magnetic toner of the present invention is 3 to 15 µm, preferably 5 to 12 µm. The magnetic particles for a magnetic toner of the present invention will be explained with reference to drawings in the following.

Figure 4:
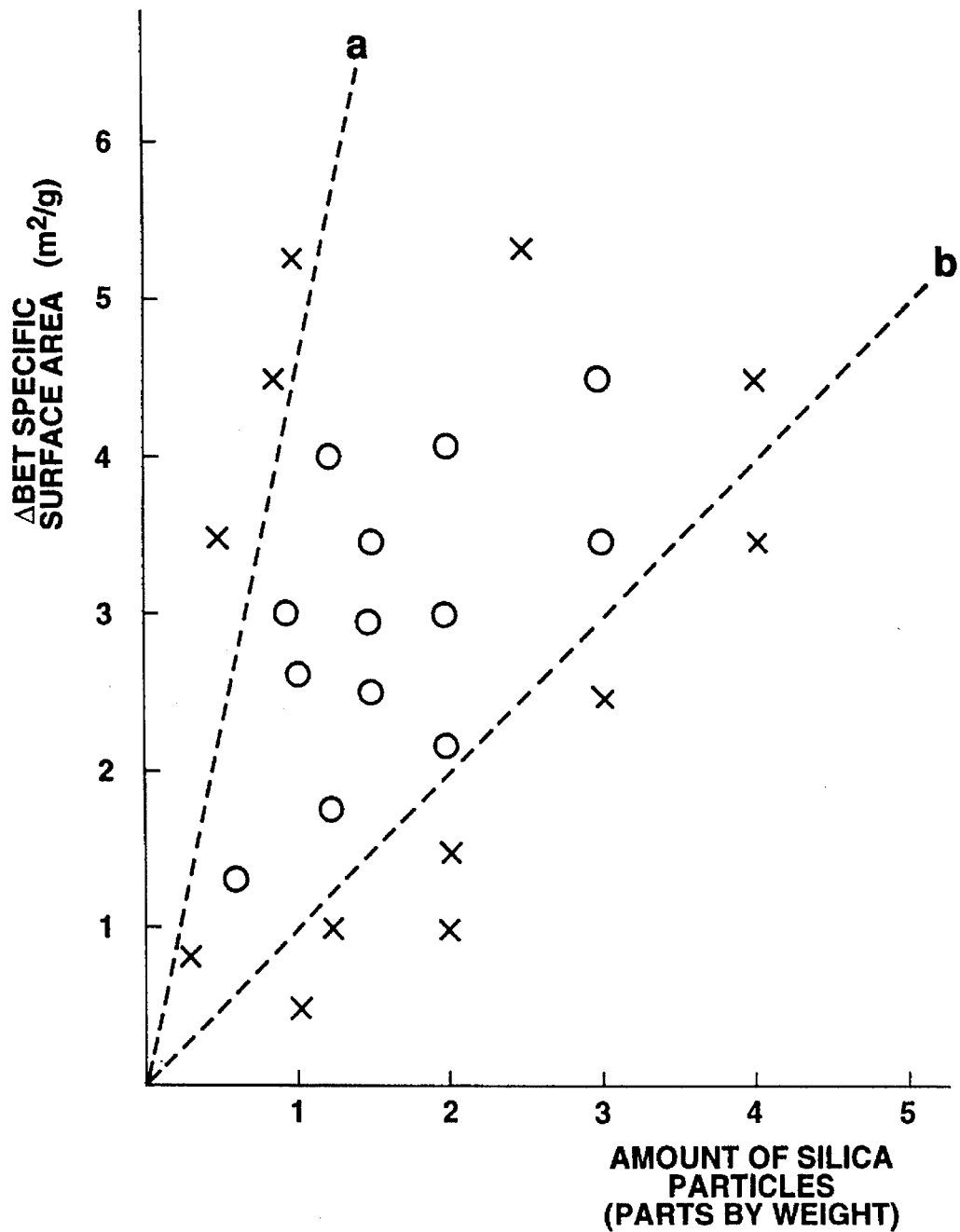
FIG. 4 shows the relationship between the amount of fine silica particles used and the ΔBET specific surface area of the spherical magnetite particles with the fine silica particles adhered thereto.

FIG. 4 shows the relationship between the amount of fine particles of a silica compound used and the increment of the specific surface area of the spherical spinel-type iron oxide particles with fine silica particles adhered thereto, namely, the difference (hereinunder referred to as ΔBET) between the BET specific surface area of the spherical spinel-type iron oxide particles with the fine silica particles adhered thereto and the specific surface area of the spherical spinel-type iron oxide particles before the fine silica particles are adhered thereto while the kind and the amount of the silica compound and the line load of a Simpson mix muller is varied.

In other words, FIG. 4 shows the relationship between the amount of fine particles of a silica compound used and the increment of the specific surface area of the spherical magnetite particles with the fine silica particles adhered thereto obtained in the same way as in later-described Example 13 except for varying the kind and the amount of fine particles of a silica compound and the line load of the Simpson mix muller.

In FIG. 4, the spherical magnetite particles ranked with "o" had an excellent fluidity, while the spherical magnetite particles ranked with "x" had a poor fluidity. It was confirmed that the spherical magnetite particles having a good excellent fluidity had a specific amount of fine silica particles adhered thereto, that an increment of the specific surface area thereof was 1 to 5 m$^2$/g and that a ΔBET/ (amount of fine silica particles) ratio is 1.0 to 4.5.

In FIG. 4, the broken line a is the line on which the ΔBET/(amount of fine silica particles) ratio is 4.5, and the broken line b is the line on which the ΔBET/(amount of fine silica particles) ratio is 1.0.

Figure 5:
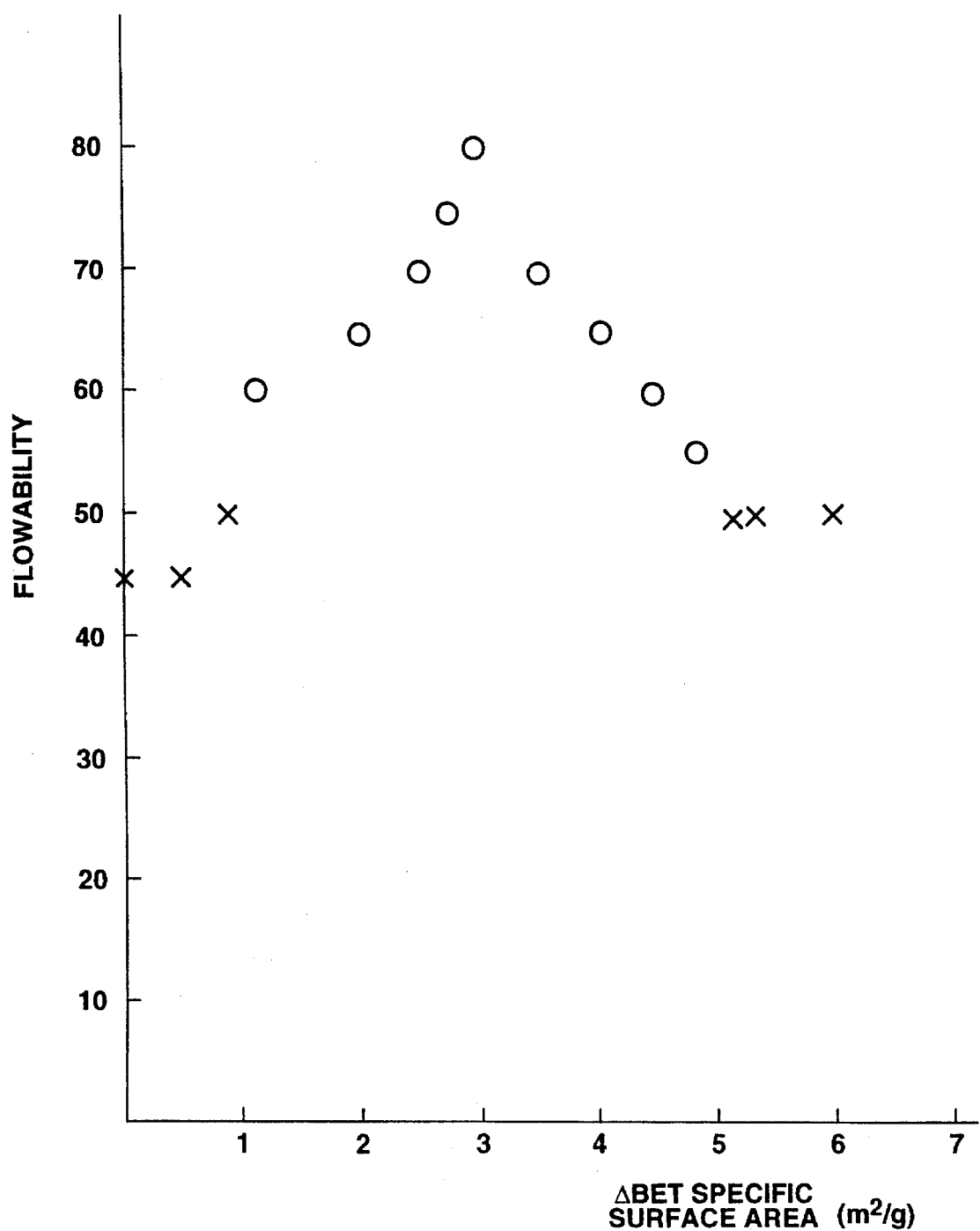
FIG. 5 shows the relationship between the ΔBET of the spherical magnetite particles with the fine silica particles adhered thereto and the flowability.

FIG. 5 shows the relationship between the ΔBET and the flowability of the spherical magnetite particles with fine silica particles adhered thereto obtained in the same way as in later-described Example 13 except for varying the amount of fine silica particles and the line load of the Simpson mix muller.

As shown in FIG. 5, the spherical magnetite particles with the fine silica particles adhered thereto in which the ΔBET is in the range of 1 to 5 m$^2$/g had an excellent fluidity represented by the flowability of not less than 55.

The magnetic particles composed of spherical spinel-type iron oxide particles of the present invention has as low a residual magnetization as possible, so that the magnetic agglomerating force is small and the flowability is excellent. Thus, the magnetic particles of the present invention is suitable for a magnetic toner. A magnetic toner produced from the magnetic particles of the present invention has also excellent fluidity.

Figure 7:
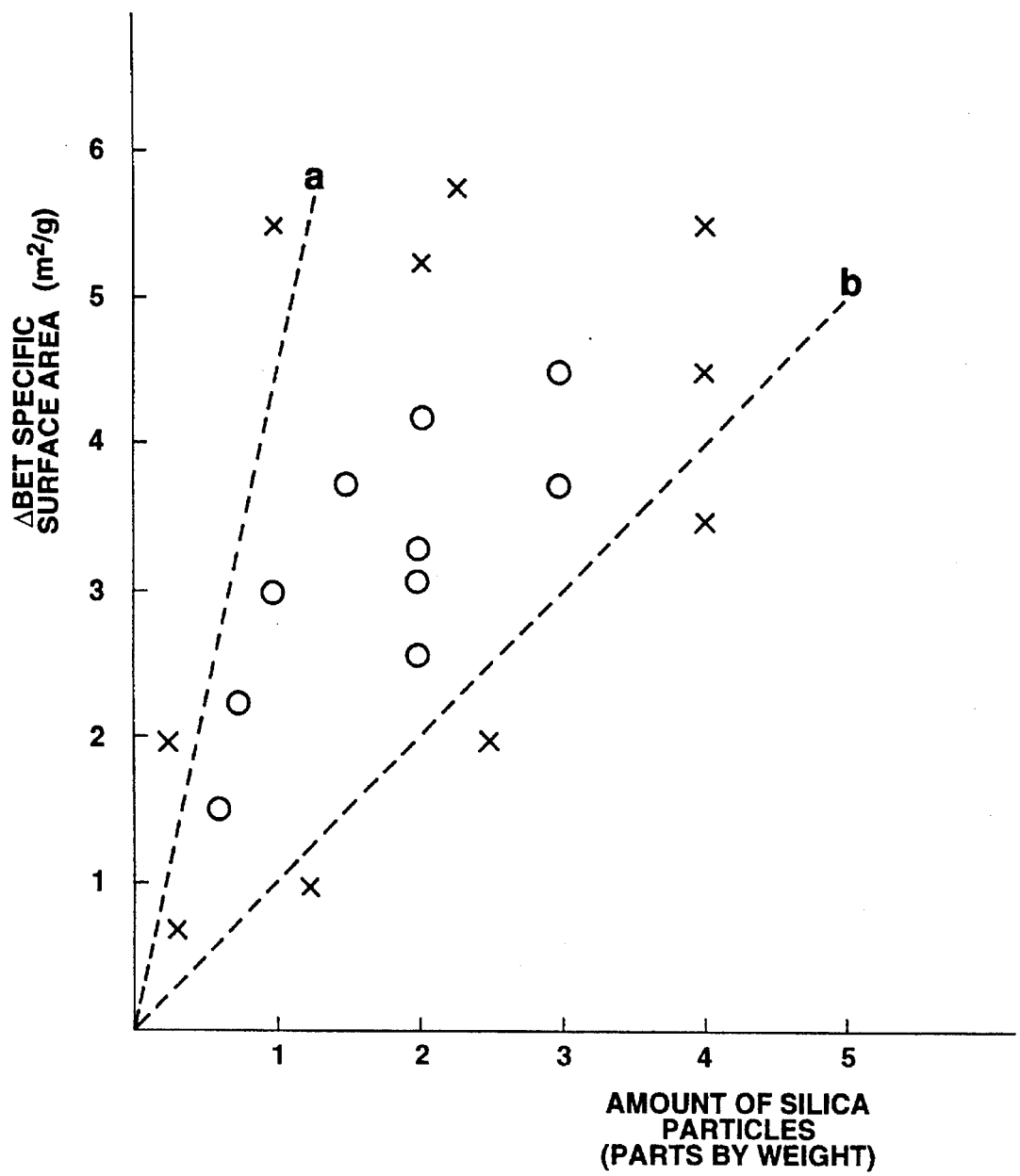
FIG. 7 shows the relationship between the amount of fine silica particles used and the ΔBET specific surface area of the hexahedral magnetite particles with the fine silica particles adhered thereto.

FIG. 7 shows the relationship between the amount of fine particles of a silica compound used and the increment of the specific surface area of the hexahedral spinel-type iron oxide particles with fine silica particles adhered thereto, namely, the difference (ΔBET) between the BET specific surface area of the hexahedral spinel-type iron oxide particles with the fine silica particles adhered thereto and the specific surface area of the hexahedral spinel-type iron oxide particles before the fine particles are adhered thereto, while the kind and the amount of the silica compound and the line load of a Simpson mix muller is varied.

In other words, FIG. 7 shows the relationship between the amount of fine particles of a silica compound used and the increment of the specific surface area of the hexahedral magnetite particles with the fine silica particles adhered thereto obtained in the same way as in later-described Example 24 except for varying the kind and the amount of fine particles of a silica compound and the line load of the Simpson mix muller.

In FIG. 7, the hexahedral magnetite particles ranked with "o" had an excellent fluidity while the hexahedral magnetite particles ranked with "x" had a poor fluidity. It was confirmed that the hexahedral magnetite particles having a good excellent fluidity had a specific amount of fine silica particles adhered thereto, that the increment of the specific surface area thereof was 1 to 5 m$^2$/g and that the ΔBET/ (amount of fine silica particles) ratio is 1.0 to 4.5.

Figure 8:
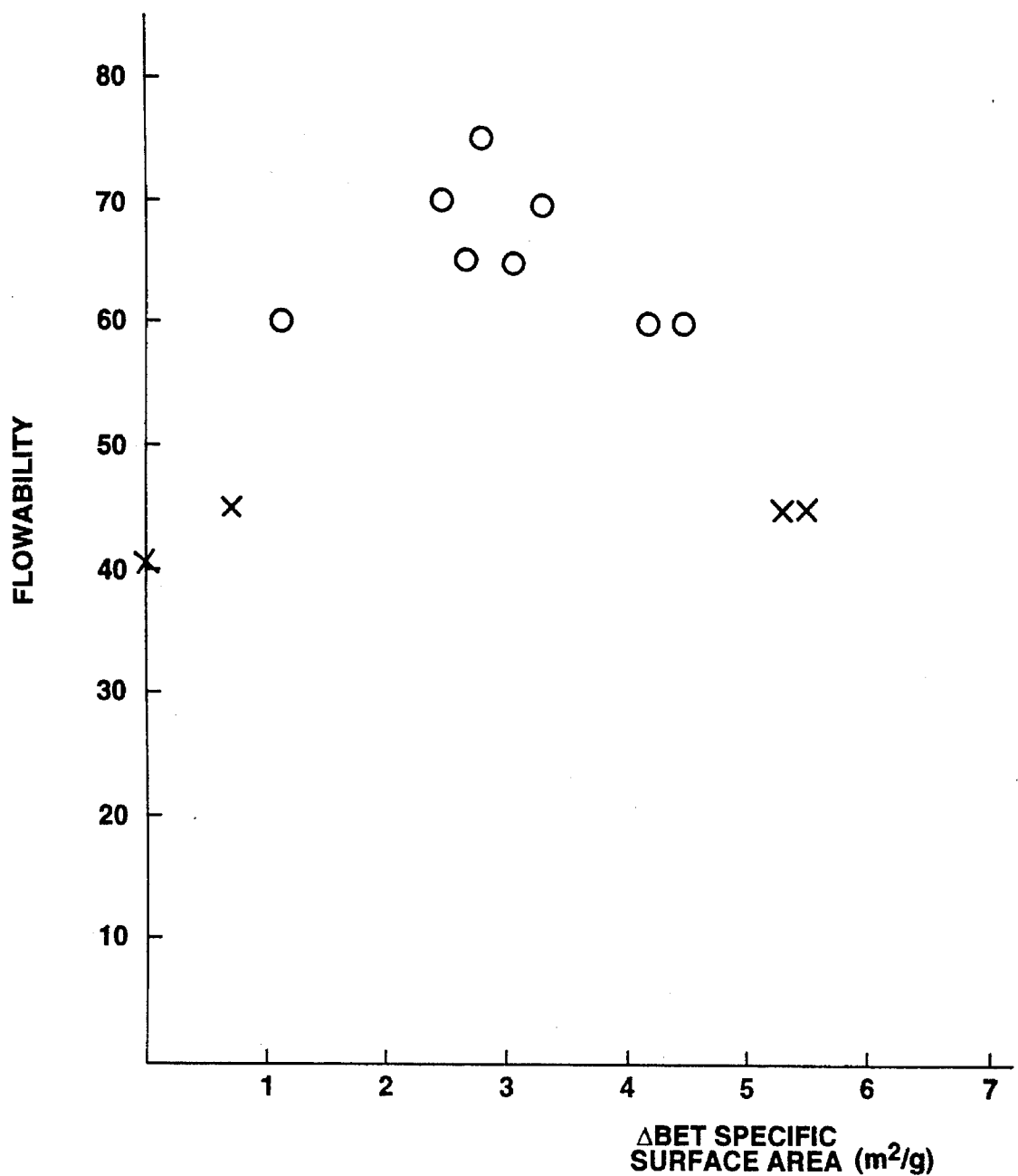
FIG. 8 shows the relationship between the ΔBET of the hexahedral magnetite particles with the fine silica particles adhered thereto and the flowability.

FIG. 8 shows the relationship between the ΔBET and the flowability of the hexahedral magnetite particles with fine silica particles adhered thereto obtained in the same way as in later-described Example 24 except for varying the amount of fine silica particles and the line load of the Simpson mix muller.

As shown in FIG. 8, the hexahedral magnetite particles with the fine silica particles adhered thereto in which the ΔBET is in the range of 1 to 5 m$^2$/g had an excellent fluidity represented by the flowability of not less than 55.

The magnetic particles composed of hexahedral spinel-type iron oxide particles of the present invention has a high Fe$^{2+}$ content, as shown in later-described examples, so that the blackness is high and the fluidity is excellent. Thus, the magnetic particles of the present invention is suitable for a magnetic toner. A magnetic toner produced from the magnetic particles of the present invention has also a high blackness and excellent fluidity.

Figure 11:
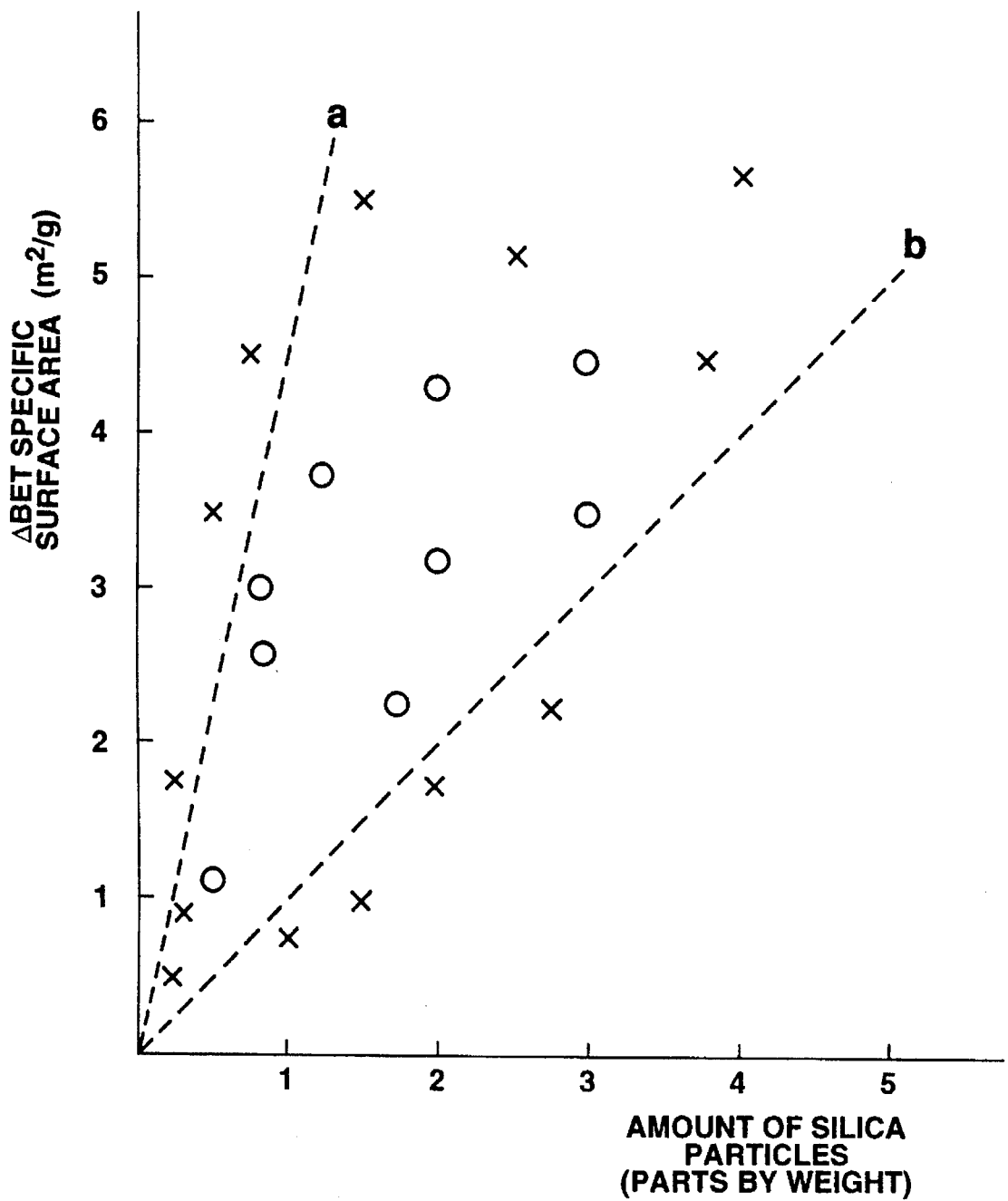
FIG. 11 shows the relationship between the amount of fine silica particles used and the ΔBET specific surface area of the octahedral magnetite particles with the fine silica particles adhered thereto.

FIG. 11 shows the relationship between the amount of the fine particles of a silica compound used and the increment of the specific surface area of the octahedral spinel-type iron oxide particles with fine silica particles adhered thereto, namely, the difference (ΔBET) between the BET specific surface area of the octahedral spinel-type iron oxide particles with the fine silica particles adhered thereto and the specific surface area of the octahedral spinel-type iron oxide particles before the fine particles are adhered thereto, while the kind of the silica compound and the line load of a Simpson mix muller is varied.

In other words, FIG. 11 shows the relationship between the amount of fine silica particles used and the increment (ΔBET) of the BET specific surface area of the octahedral magnetite particles with the fine silica particles adhered thereto obtained in the same way as in later-described Example 34 except for varying the kind and the amount of fine silica particles and the line load of the Simpson mix muller.

In FIG. 11, the octahedral magnetite particles ranked with "o" had an excellent fluidity while the octahedral magnetite particles ranked with "x" had a poor fluidity. It was confirmed that the octahedral magnetite particles having a good excellent fluidity had a specific amount of fine silica particles adhered thereto, that the increment of the specific surface area of thereof was 1 to 5 m$^2$/g, and that the ΔBET/(amount of fine particles) ratio is 1.0 to 4.5.

In FIG. 11, the broken line a is the line on which the ΔBET/(amount of fine particles) ratio is 4.5, and the broken line b is the line on which the ΔBET/(amount of fine particles) ratio is 1.0.

Figure 12:
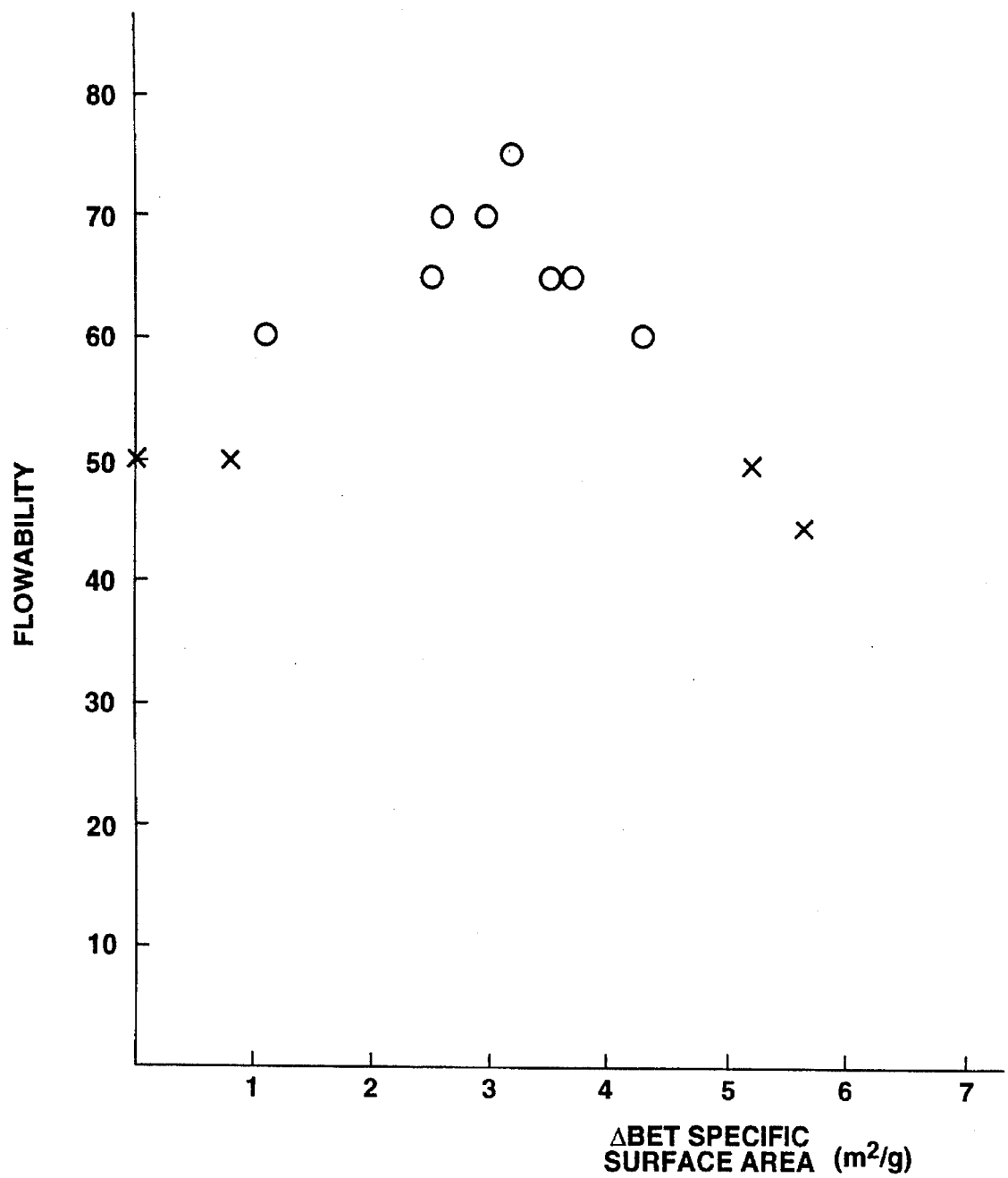
FIG. 12 shows the relationship between the ΔBET of the octahedral magnetite particles with the fine silica particles adhered thereto and the flowability.

FIG. 12 shows the relationship between the ΔBET and the flowability of the octahedral magnetite particles with fine silica particles adhered thereto obtained in the same way as in later-described Example 34 except for varying the amount of fine silica particles and the line load of the Simpson mix muller.

As shown in FIG. 12, the octahedral magnetite particles with the fine silica particles adhered thereto in which the ΔBET is in the range of 1 to 5 m²/g had an excellent fluidity represented by the flowability of not less than 55.

The magnetic particles composed of octahedral spinel-type iron oxide particles of the present invention has a large residual magnetization, as shown in later-described examples, so that the fluidity is excellent. Thus, the magnetic particles of the present invention is suitable for a magnetic toner. A magnetic toner produced from the magnetic particles of the present invention has also a high residual magnetization and excellent fluidity.

EXAMPLES

The present invention will now be described in more detail with reference to the following examples and comparative examples.

The shapes of the iron oxide particles in the Examples and Comparative Examples are observed through a transmission electron microscope and a scanning electron microscope.

As the particle size of the iron oxide particles, the area-average diameter calculated from the Martin diameter (the length of the bisector which bisects a projected area in a predetermined direction) of a projected particle was used. The specific surface area of the iron oxide particles was obtained by a BET method by using "Mono Sorb MS-11", manufactured by Yuasa Ionics K.K.

The specific surface area of inorganic particles was obtained from the particles dried at a temperature of 120° C. to evaporate the water content. The ΔBET was calculated from the formula: ΔBET= [(BET specific surface area of the iron oxide particles with the inorganic fine particles adhered thereto)− (specific surface area of the iron oxide particles, calculated by the formula: $6/(\rho \cdot d_3) \times \phi_s)$]. The glossiness of the surface of the resin film was measured at an incidence angle of 60° by a "digital glossmeter UGV-50", manufactured by Suga Testing Machine Co., Ltd.

The magnetic characteristics of the spherical, hexahedral or octahedral spinel-type iron oxide particles were measured by using a "Vibration Sample Magnetometer VSM-3S-15", manufactured by Toei Rogyo Co., Ltd. and applying an external magnetic field of 10 kOe.

The BET specific surface area of fine silica particles adhered to the surface of spherical, hexahedral or octahedral spinel-type iron oxide particles was obtained from colloidal silica dried at a temperature of 120° C. to evaporate the water content. The ΔBET was calculated from the formula: ΔBET= [ (BET specific surface area of the magnetic particles treated with the colloidal silica)−(specific surface area of the magnetic particles, calculated by the formula: $6/(\rho \cdot d_3) \times \phi_s)$]. The fluidity of the magnetic particles and the magnetic toner were measured by a "Powder tester PT-E", manufactured by Hosokawa Micron Co., Ltd.

An image was produced by a laser shot LBP-B406E using a magnetic toner, and the fine line reproducibility was visually observed. The evaluation was made on the following criteria. The rank of not less than 3 is desirable.

Excellent: 4

Good: 3

Bad: 2

Very bad: 1

Furthermore, the presence or absence of a photographic fog in the image was visually observed. The evaluation was made on the following criteria. The rank of not less than 3 is desirable.

None: 4

Almost none: 3

A slight amount: 2

A large amount: 1

In addition, the presence or absence of the toner flown about on the image was visually observed. The evaluation was made on the following criteria. The rank of not less than 3 is desirable.

None: 4

Almost none: 3

A slight amount: 2

A large amount: 1

The following four factors were measured and each index shown in Table 6.3 described in FINE PARTICLES INDUSTRY HANDBOOK, page 151, published by Fine Particles Industry Association (Feb. 28, 1986) was obtained. The flowability was evaluated on the basis of the sum of the indices.

(1) Angle of repose: The angle of inclination of the precipitated layer was measured which was formed when the particles filtered through a standard sieve were poured onto a disk of 8 cm in diameter through a funnel.

(2) Compaction degree: Particles were charged into a cylindrical container having a predetermined volume (100 cm3), and the compaction degree ψ (%) was obtained from the bulk density $\rho_a$ (g/cm³) of the particles in a state of being sparsely packed and the bulk density $\rho_c$ (g/cm³) thereof being densely packed by a predetermined number of tappings in accordance with the following formula:

$$\psi=(\rho_c-\rho_a)/\rho_c \times 100 \ (\%)$$

(3) Spatula angle: A spatula having a predetermined width (22 mm) was inserted into the layer of the precipitated particles, and the spatula was lifted. The angle of inclination of the layer of the particles on the spatula was measured. A slight shock was then applied to the spatula and the angle of inclination was measured again. The average of the two values was represented by the spatula angle.

(4) Agglomeration degree (uniformity): These two factors are selected depending upon the particles being measured. The agglomeration degree was applied to fine particles and particles having a strong agglomeration property, while the uniformity was applied to particles having a comparatively uniform particle size.

Example 1

10 kg of irregular shape hematite particles having a specific surface area of 2.1 m²/g (specific gravity ρ: 5.2, area-average particle diameter $d_3$: 0.6 μm) was added to and stirred with 100 liter of water. A sodium hydroxide solution was added to this aqueous suspension to adjust the pH thereof to 10. After 1006 g (3 parts by weight calculated as $Al_2O_3$) of aluminium sulfate (dehydrate) was added to the suspension at a temperature of 70° C. and the mixture was stirred for 10 minutes, diluted sulfuric acid was gradually added to the resultant mixture to adjust the pH to 8.0 to 8.5, thereby precipitating the fine particles of an aluminum oxygen compound composed of mixed fine particles of boehmite AlO(OH) and gibbsite Al(OH)$_3$ as the main ingredient (This process will be referred to as "precipitation process I" hereinunder.). The suspension was aged for 30 minutes, and diluted sulfuric acid was then added to the suspension to adjust the pH to 7. Thereafter, the resultant suspension was filtered, washed with water and dried to obtain a mixture of the hematite particles and the fine particles of the oxygen compound.

The BET specific surface area of the mixture obtained was 13.1 m²/g.

10 kg of the obtained mixture was charged into a "Sand Xill MPUV-2" (trade name: manufactured by Matsumoto Chuzo Tekkosho Co., Ltd.), which was a Simpson mix muller, and mixed for 60 minutes while applying a line load of 80 kg/cm to adhere mixed the fine particles of the aluminum oxygen compound and the hydrous aluminum oxide produced from a part of the aluminum oxygen compound which changed during the mixing operation, to the surfaces of the hematite particles.

The BET specific surface area of the thus-obtained hematite particles with the mixed fine particles adhered to the surfaces thereof was 4.1 m²/g, and the $\Delta$BET was 2.0 m²/g.

Examples 2, 3, 9 to 12, and Comparative Example 2

The iron oxide particles with inorganic fine particles adhered to the surfaces thereof were obtained in the same way as in Example 1 except for varying the kind of particles to be treated, the kind and the mixing ratio of the inorganic fine particles, and the kind, the line load and the operation time of the machine.

The main producing conditions are shown in Tables 1 and 2.

Example 5

10 kg of spherical magnetite particles having a specific surface area of 6.9 m²/g (specific gravity $\rho$: 5.2, area-average particle diameter $d_3$: 0.25 μm) was added to and stirred with 100 liter of water. 1 kg (6 parts by weight calculated as $Al_2O_3$) of alumina sol having a BET specific surface area of 180 m²/g, "AS-520" (trade name, produced by Nissan Chemical Industries, Ltd.) was added to the aqueous suspension, and the obtained mixture was aged for 30 minutes while maintaining the pH of 7 (This process will be referred to as "precipitation process II" hereinunder.). Thereafter, the resultant suspension was filtered, washed with water and dried to obtain a mixture of the magnetite particles, the fine particles of the aluminum oxygen compound and a hydrous aluminum oxide.

The BET specific surface area of the mixture obtained was 14.0 m²/g.

10 kg of the obtained mixture was charged into a "Sand Mill MPUV-2" (trade name: manufactured by Matsumoto Chuzo Tekkosho Co., Ltd.), which was a Simpson mix muller, and mixed for 60 minutes while applying a line load of 80 kg/cm to adhere the fine particles of the aluminum oxygen compound and the hydrous aluminum oxide to the surfaces of the magnetite particles.

The BET specific surface area of the thus-obtained magnetite particles with the fine particles of the aluminum oxygen compound and the hydrous aluminum oxide adhered to the surfaces thereof was 12.4 m²/g, and the $\Delta$BET was 5.5 m²/g.

Examples 6, 7 and Comparative Examples 3, 4

The iron oxide particles with inorganic fine particles adhered to the surfaces thereof were obtained in the same way as in Example 5 except for varying the kind of particles to be treated, the kind and the mixing ratio of the inorganic fine particles, and the type, the line load and the operation time of the machine.

The main producing conditions are shown in Tables 1 and 2.

Example 4

10 kg of spherical magnetite particles having a specific surface area of 6.9 m²/g (specific gravity $\rho$: 5.2, area-average particle diameter $d_3$: 0.25 μm), and 1 kg (2 parts by weight calculated as $Al_2O_3$) of alumina sol having a BET specific surface area of 180 m²/g, "AS-520" (trade name, produced by Nissan Chemical Industries, Ltd.) were charged into a "Sand Mill MPUV -2" (trade name: manufactured by Matsumoto Chuzo Tekkosho Co., Ltd.), which was a Simpson mix muller, and mixed for 60 minutes while applying a line load of 80 kg/cm to adhere mixed fine particles of the aluminum oxygen compound and a hydrous aluminum oxide to the surfaces of the magnetite particles (This process will be referred to as "addition process III" hereinunder.).

The BET specific surface area of the thus-obtained magnetite particles with the mixed fine particles adhered to the surfaces thereof was 9.9 m²/g, and the $\Delta$BET was 3.0 m²/g.

Example 8 and Comparative Examples 6, 7

The iron oxide particles with inorganic fine particles adhered to the surfaces thereof were obtained in the same way as in Example 4 except for varying the kind of particles to be treated, the kind and the mixing ratio of the inorganic fine particles, and the kind, the line load and the operation time of the machine.

The main producing conditions are shown in Tables 1 and 2. In Comparative Example 7, the surfaces of the iron oxide particles were coated with a titanate coupling agent in accordance with a method described in Japanese Patent Application Laid-Open (KOKAI) No. 3-221965 (1991).

Comparative Example 1

The iron oxide particles were obtained in the same way as in Example 1 except that the fine particles of the aluminum oxygen compound were not adhered to the surfaces thereof.

The main producing conditions are shown in Table 2.

Comparative Example 5

The iron oxide particles were obtained in the same way as in Example 4 except that the fine particles of the aluminum oxygen compound were not adhered to the surfaces thereof.

The main producing conditions are shown in Table 2.

<Evaluation methods>
Evaluation A

The hematite particles obtained in Example 1 were kneaded with the following components in the following mixing ratio for 10 minutes by a hot twin roll, and thereafter the obtained mixture was formed into a sheet by a hot press. The change in the glossiness of the sheet after it was stored at a temperature of 130° C. under a normal pressure was measured. The results are shown in Table 3.

| Composition: | |
| --- | --- |
| Iron oxide particles | 1 g |
| Polyvinyl chloride resin | 50 g |
| Dioctyl terephthalate | 25 g |

| Composition: | |
|---|---|
| Zinc stearate | 0.5 g |

Since the change in the glossiness was small, it was confirmed that the deterioration of the resin was sufficiently suppressed.

Evaluation B

The iron oxide particles obtained in Examples 2 to 4 and 10 to 12, and Comparative Examples 1 to 4 were respectively mixed with the following components in the following mixing ratio until the mixture became uniform to prepare paste colors. Each of the paste colors was charged into a glass bottle and stored at a temperature of 50° C. under a normal pressure. The gelation of each paste color was visually observed.

| Composition: | |
|---|---|
| Iron oxide particles | 7 g |
| Unsaturated polyester (Copolymer) | 100 g |
| Calcium carbonate | 120 g |
| Curing agent | 1 g |

The numbers of days taken for the complete gelation are shown in Tables 3 and 4. The number of days taken for the complete gelation in each of Examples 2 to 4 and 10 to 12 is not less than 5 days, especially not less than 6 days, which showed that the gelation of the resin was sufficiently suppressed. In each of Comparative Examples 1 to 4, the number of days taken for the complete gelation was not more than 4 days, which showed that the suppression of gelation of the resin was insufficient.

Evaluation C 20 g of the iron oxide particles produced in Example 5 and 80 g of alkid-modified acrylate resin (copolymer) were kneaded for 10 minutes at room temperature by a three roll. The kneaded product was left gelation thereof was visually observed.

The number of days taken for the complete gelation was 7 days, which showed that the gelation of the resin was sufficiently suppressed.

The number of days taken for the complete gelation of the iron oxide particles ($\Delta$BET: 7.5 m$^2$/g) which were obtained in the same way as in Example 5 except for using a blade-type Henschel mixer in place of a Simpson mix muller was 2 days, which showed that the suppression of gelation of the resin was insufficient.

Evaluation D

The iron oxide particles obtained in Examples 6 to 9 were respectively kneaded with the following components in the following mixing ratio at a temperature of 160° C. for 10 minutes by a hot twin roll, and thereafter the obtained mixture was formed into a sheet by a hot press. The change in the glossiness of the sheet after stored for 3 days at a temperature of 60° C. under a normal pressure was measured. The results are shown in Tables 3 and 4.

| Composition: | |
|---|---|
| Iron oxide particles | 2 g |
| Polypropylene resin | 98 g |

Since the change in the glossiness of the sheet containing the iron oxide particles of each of Examples 6 to 9 was small, it was confirmed that the deterioration of the resin was sufficiently suppressed.

On the other hand, the change in the glossiness of the sheet containing the iron oxide particles of each of Comparative Examples 5 to 7 was large, which showed that the suppression of gelation of the resin was insufficient.

Example 13

10 kg of the spherical magnetite particles having a surface-average diameter of 0.25 μm (a specific surface area: 7.0 m$^2$/g, saturation magnetization: 83.5 emu/g, residual magnetization: 5.5 emu/g) which were produced from an aqueous solution by a wet process and 500 g (2 parts by weight calculated as SiO$_2$ based on 100 parts by weight of magnetite particles) of colloidal silica having a specific surface area of 172 m$^2$/g, "Snowtex ST-40" (trade name, produced by Nissan Chemical Industries, Ltd.) were charged into a "Sand Mill MPUV- 2" (trade name: manufactured by Matsumoto Chuzo Tekkosho CO., Ltd.), which was a Simpson mix muller, and mixed for 60 minutes while applying a line load of 40 kg/cm to adhere the fine silica particles to the surfaces of the spherical magnetite particles.

The BET specific surface area of the thus-obtained spherical magnetite particles with the fine silica particles adhered to the surfaces thereof was 10.0 m$^2$/g, and the $\Delta$BET was 3.0 m$^2$/g. The flowability was as excellent as 75. As to the magnetic characteristics, the saturation magnetization was 81.5 emu/g, and the residual magnetization was 5.2 emu/g.

Example 14 to 23, Comparative Examples 8 to 13

The spinel-type iron oxide particles with fine silica particles adhered to the surfaces thereof were obtained in the same way as in Example 13 except for varying the kind of particles being treated, the kind and the mixing ratio of the fine silica particles, and the kind and the line load of the machine.

The main producing conditions are shown in Tables 5 to 8.

Figure 2:
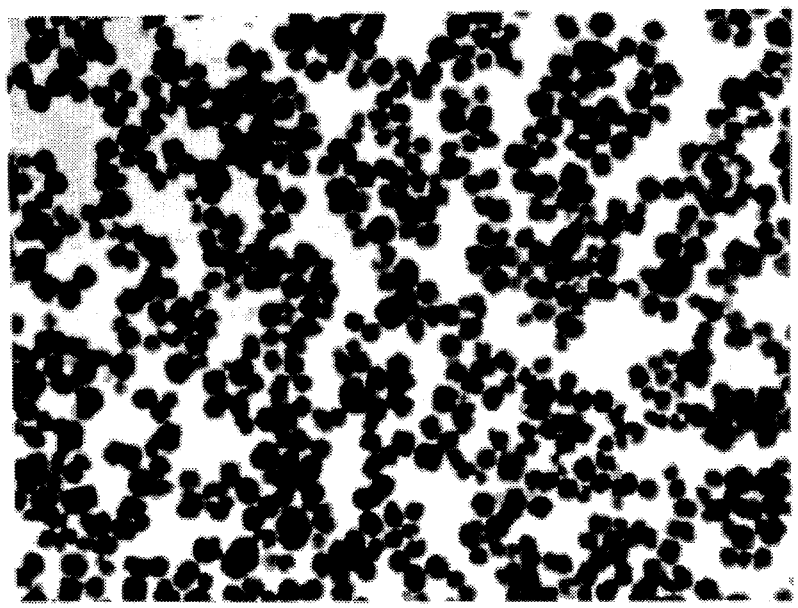
FIG. 2 shows an electron micrograph (× 20000) showing the structure of the spherical magnetite particles to be treated in Example 21.
Figure 3:
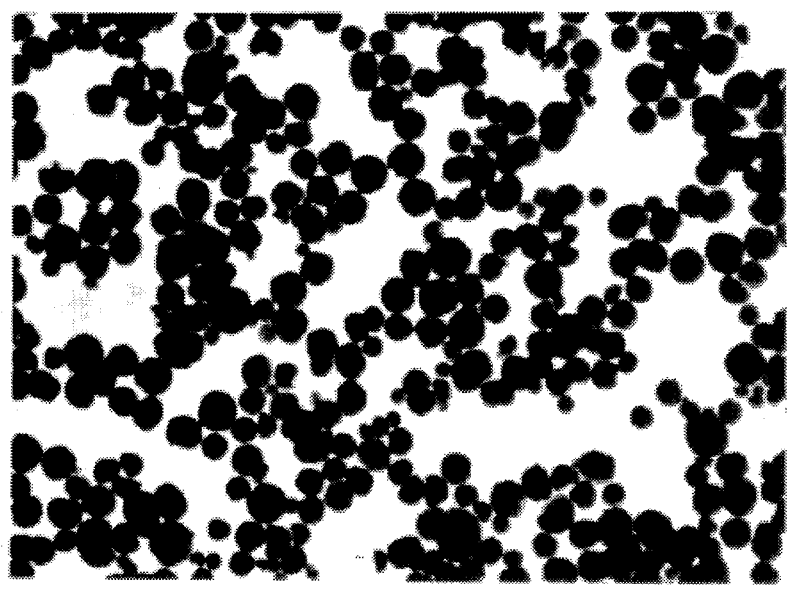
FIG. 3 is an electron micrograph (×20000) showing the structure of the spherical spinel-type ferrite particles containing 2 mol % of zinc (calculated as Zn/Fe) to be treated in Example 23.

FIGS. 2 and 3 are electron micrographs (×20000) showing the structures of the spherical spinel-type magnetite particles and the spherical spinel-type ferrite particles (containing 2 mol % of zinc (calculated as Zn/Fe)) to be treated in Examples 21 and 23, respectively.

In Table 5, the BET specific surface area of Snowtex ST-S is 232 m$^2$/g and the BET specific surface area of Snowtex ST-XS is 350 m$^2$/g.

Example 24

10 kg of the hexahedral magnetite particles having a surface-average diameter of 0.23 μm (a specific surface area: 6.5 m$^2$/g, saturation magnetization: 87.5 emu/g, Fe$^{2+}$/Fe$^{3+}$ (molar ratio): 0.38) which were produced from an aqueous solution by a wet process and 500 g (2 parts by weight calculated as SiO$_2$ based on 100 parts by weight of magnetite particles) of colloidal silica having a specific surface area of 172 m$^2$/g, "Snowtex ST-40" (trade name, produced by Nissan Chemical Industries, Ltd.) were charged into a "Sand Mill MPUV- 2" (trade name: manufactured by Matsumoto Chuzo Tekkosho Co., Ltd.), which was a Simpson mix muller, and mixed for 60 minutes while applying a line load of 40 kg/cm to adhere the fine silica particles to the surfaces of the hexahedral magnetite particles.

The BET specific surface area of the thus-obtained hexahedral magnetite particles with the fine silica particles adhered to the surfaces thereof was 9.6 m$^2$/g and the $\Delta$BET was 3.1 m$^2$/g. The flowability was as excellent as 70. The magnetization was 85.6 emu/g, and Fe$^{2+}$/Fe$^{3+}$ (molar ratio) was 0.37 in molar ratio.

Example 25 to 33, Comparative Examples 14 to 19

The spinel-type iron oxide particles with fine silica particles adhered to the surfaces thereof were obtained in the same way as in Example 24 except for varying the kind of particles to be treated, the kind and the mixing ratio of the fine silica particles, and the kind and the line load of the machine.

The main producing conditions are shown in Tables 9 to 12.

Figure 6:
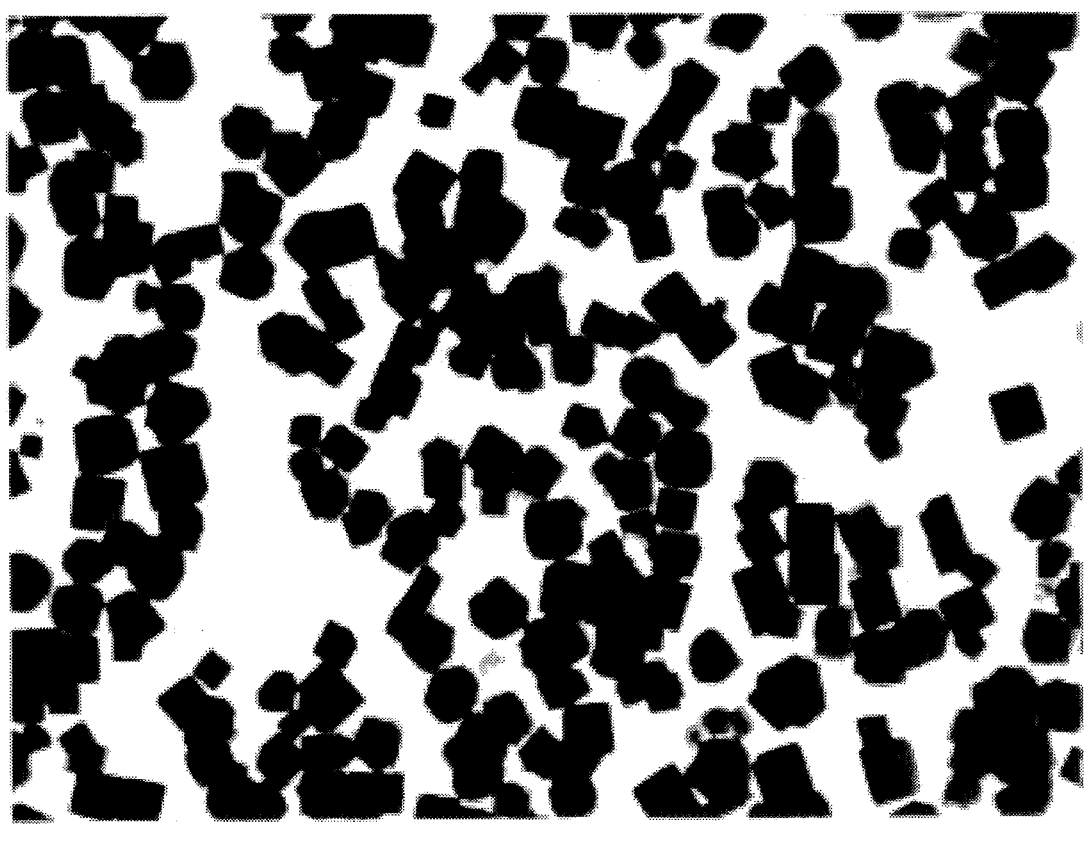
FIG. 6 is an electron micrograph (× 20000) showing the structure of the hexahedral magnetite particles to be treated in Example 24.

FIG. 6 is an electron micrograph (×20000) showing the structure of the hexahedral magnetite particles to be treated in Example 24.

In Table 9, the BET specific surface area of Snowtex ST-S is 232 m$^2$/g and the BET specific surface area of Snowtex ST-XS is 350 m$^2$/g.

Example 34

10 kg of the spherical magnetite particles having a surface-average diameter of 0.40 μm (BET specific surface area: 5.0 m$^2$/g, saturation magnetization: 85.0 emu/g, residual magnetization: 10.5 emu/g) which were produced from an aqueous solution by a wet process and 500 g (2 parts by weight calculated as SiO$_2$ based on 100 parts by weight of magnetite particles) of colloidal silica having a specific surface area of 172 m$^2$/g, "Snowtex ST-40" (trade name, produced by Nissan Chemical Industries, Ltd.) were charged into a "Sand Mill MPUV- 2" (trade name: manufactured by Matsumoto Chuzo Tekkosho Co., Ltd.), which was a Simpson mix muller, and mixed for 60 minutes while applying a line load of 40 kg/cm to adhere the fine silica particles to the surfaces of the octahedral magnetite particles.

The BET specific surface area of the thus-obtained octahedral magnetite particles with the fine silica particles adhered to the surfaces thereof was 8.2 m$^2$/g, and the $\Delta$BET was 3.2 m$^2$/g. The flowability was as excellent as 75. As to the magnetic characteristics, the saturation magnetization was 83.1 emu/g, and the residual magnetization was 10.1 emu/g.

Example 35 to 43, Comparative Examples 20 to 25

The spinel-type iron oxide particles with fine silica particles adhered to the surfaces thereof were obtained in the same way as in Example 34 except for varying the kind of particles being treated, the kind and the mixing ratio of the fine silica particles, and the kind and the line load of the machine.

The main producing conditions are shown in Tables 13 to 16.

Figure 9:
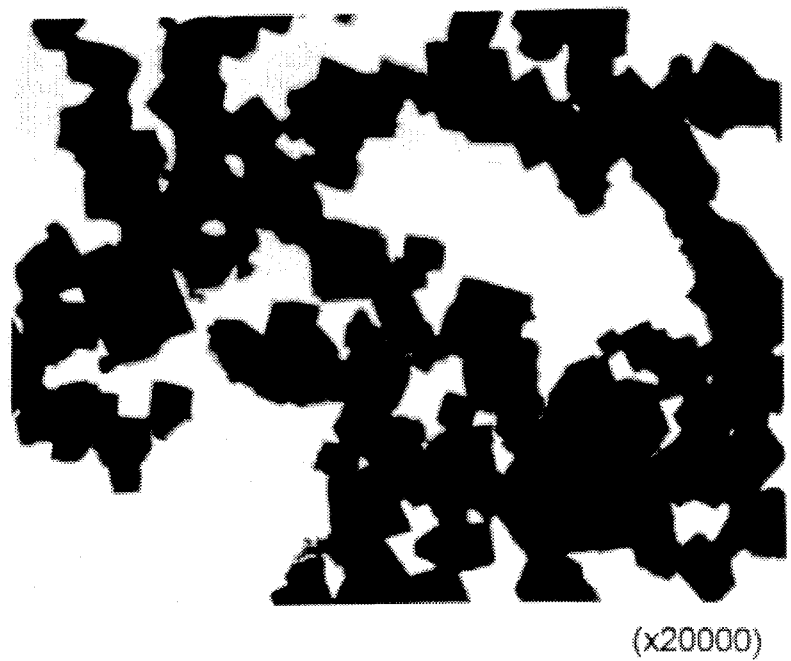
FIG. 9 is an electron micrograph (× 20000) showing the structure of the octahedral magnetite particles to be treated in Example 34.
Figure 10:
FIG. 10 is an electron micrograph (× 20000) showing the structure of the octahedral magnetite particles to be treated in Example 39.

FIGS. 9 and 10 are electron micrographs (×20000) showing the structures of the octahedral spinel-type magnetite particles to be treated in Examples 34 and 39, respectively.

In Table 13, the BET specific surface area of Snowtex ST-S is 232 m$^2$/g and the BET specific surface area of Snowtex ST-XS is 350 m$^2$/g.

Example 44

The spherical magnetite particles with fine silica particles adhered to the surfaces thereof obtained in Example 13 were mixed with the following components in the following mixing ratio by a mixer, and the obtained mixture was melted and kneaded for 10 minutes by a hot twin roll. After chilling the kneaded mixture, it was pulverized into coarse particles and then into fine particles (by a fine mill). The pulverized particles were classified and a magnetic toner composed of the particles having a volume-average particle diameter of 12 to 13 μm (measured by a "Couter Counter TA-II", manufactured by Couter Electronics Corporation). 0.5 part by weight of hydrophobic fine silica particles were externally added to 100 parts by weight of the magnetic toner obtained. The flowability of the final magnetic toner was 90.

| Composition: | |
| --- | --- |
| Styrene-acrylate copolymer: | 100 parts by weight |
| Negative charging regulator: | 0.5 part by weight |
| Mold release agent: | 6 parts by weight |
| Magnetic particles: | 60 parts by weight |

An image was produced by a laser shot LBP-B406E using the magnetic toner, and the image quality was evaluated.

The image had a high fine line reproducibility free from photographic fog and without any toner flown about on the image. Since the fluidity of the toner was high, the toner was coated uniformly on the sleeve, so that the rush print had a uniform blackness. The fine line producibility, and the image quality were stable for a long period.

Example 45 to 74, Comparative Examples 26 to 43

Magnetic toners were produced in the same way as in Example 44 except for varying the treated magnetic particles. Various properties of the magnetic toners are shown in Tables 17 to 19.

TABLE 1

| Examples | Iron oxide particles being treated | | | | | | Inoganic fine particles | |
|---|---|---|---|---|---|---|---|---|
| | Kind | Shape | Specific surface area (m²/g) | Area-average particle diameter (μm) | Specific gravity | Area shape factor | Addition or precipitation process | Kind of added or precipita-ted fine particles |
| Example 1 | α-Fe$_2$O$_3$ | Irregular | 2.1 | 0.60 | 5.2 | 1.1 | Precipitation process I | Al oxide compound |
| Example 2 | " | " | 2.1 | 0.60 | 5.2 | 1.1 | Precipitation process I | " |
| Example 3 | " | " | 11.5 | 0.11 | 5.2 | 1.1 | Precipitation process I | " |
| Example 4 | Fe$_3$O$_4$ | Spherical | 6.9 | 0.25 | 5.2 | 1.5 | Precipitation process III | Al oxide compound and Al$_2$O$_3$ hydrate compound |
| Example 5 | " | " | 6.9 | 0.25 | 5.2 | 1.5 | Precipitation process II | Al oxide compound and Al$_2$O$_3$ hydrate compound |
| Example 6 | " | " | 6.9 | 0.25 | 5.2 | 1.5 | Precipitation process II | Zr oxide compound and hydrate ZrO$_2$ compund |
| Example 7 | " | Hexahedral | 6.8 | 0.22 | 5.2 | 1.3 | Precipitation process II | Ti oxide compound and hydrate TiO$_2$ compund |
| Example 8 | " | Octahedral | 5.0 | 0.39 | 5.2 | 1.7 | Precipitation process III | Si oxide compound and SiO$_2$ hydrate compund |
| Example 9 | γ-Fe$_2$O$_3$ | Spherical | 7.2 | 0.24 | 5.2 | 1.5 | Precipitation process I | Al oxide compound |
| Example 10 | α-Fe$_2$O$_3$ | Irregular | 2.1 | 0.60 | 5.2 | 1.1 | Precipitation process I | " |
| Example 11 | " | " | 2.1 | 0.60 | 5.2 | 1.1 | Precipitation process I | " |
| Example 12 | " | " | 2.1 | 0.60 | 5.2 | 1.1 | Precipitation process I | Si oxide compound |

| Mixing ratio | | Machine | | | Mixture | |
|---|---|---|---|---|---|---|
| Iron oxide particles (parts by weight) | Iroganic particles (parts by weight) | Kind | Line load (kg/cm) | Operation time (min) | BET specific surface area (m²/g) | ΔBET (m²/g) |
| 100 | 3 | Simpson mix muller (Matsumoto Chuzo Tekkosho Co. Ltd.) | 80 | 60 | 4.1 | 2.0 |
| 100 | 3 | Simpson mix muller (Matsumoto Chuzo Tekkosho Co. Ltd.) | 80 | 60 | 4.1 | 2.0 |
| 100 | 3 | Simpson mix muller (Matsumoto Chuzo Tekkosho Co. Ltd.) | 80 | 60 | 14.5 | 3.0 |
| 100 | 2 | Simpson mix muller (Matsumoto Chuzo Tekkosho Co. Ltd.) | 80 | 60 | 9.9 | 3.0 |
| 100 | 6 | Simpson mix muller (Matsumoto Chuzo Tekkosho Co. Ltd.) | 80 | 60 | 12.4 | 5.5 |
| 100 | 2 | Simpson mix muller (Matsumoto Chuzo Tekkosho Co. Ltd.) | 80 | 60 | 9.9 | 3.0 |
| 100 | 1.5 | Simpson mix muller (Matsumoto Chuzo Tekkosho Co. Ltd.) | 50 | 60 | 9.8 | 3.0 |
| 100 | 1.5 | Simpson mix muller (Matsumoto Chuzo Tekkosho Co. Ltd.) | 50 | 60 | 8.0 | 3.0 |
| 100 | 2 | Simpson mix muller (Matsumoto Chuzo Tekkosho Co. Ltd.) | 80 | 60 | 10.2 | 3.0 |
| 100 | 3 | Simpson mix muller (Matsumoto Chuzo Tekkosho Co. Ltd.) | 40 | 60 | 6.1 | 4.0 |
| 100 | 3 | Simpson mix muller (Matsumoto Chuzo Tekkosho Co. Ltd.) | 30 | 60 | 8.1 | 6.0 |
| 100 | 3 | Stotz mill (Shinto Kogyo Co. Ltd.) | 60 | 60 | 4.6 | 2.5 |

TABLE 2

| Comp. Examples | Iron oxide particles being treated | | | | | | Inorganic fine particles | |
|---|---|---|---|---|---|---|---|---|
| | Kind | Shape | BET Specific surface area ($m^2/g$) | Area-average particle diameter (μm) | Specific gravity | Area shape factor | Addition or precipitation process | Kind of added or precipitat-ed fine particles |
| Comp. Example 1 | α-$Fe_2O_3$ | Irregular | 2.1 | 0.60 | 5.2 | 1.1 | — | — |
| Comp. Example 2 | " | " | 2.1 | 0.60 | 5.2 | 1.1 | I | Al oxide compound |
| Comp. Example 3 | " | " | 2.1 | 0.60 | 5.2 | 1.1 | II | Al oxide compound and $Al_2O_3$ hydrate compound |
| Comp. Example 4 | " | " | 2.1 | 0.60 | 5.2 | 1.1 | II | Al oxide compound and $Al_2O_3$ hydrate compound |
| Comp. Example 5 | $Fe_3O_4$ | Spherical | 6.9 | 0.25 | 5.2 | 1.5 | — | — |
| Comp. Example 6 | " | " | 6.9 | 0.25 | 5.2 | 1.5 | III | Si oxide compound and $SiO_2$ hydrate compound |
| Comp. Example 7 | " | " | 6.9 | 0.25 | 5.2 | 1.5 | III | Titanate coupling agent (Ajinomoto Co., Ltd.) |

| Mixing ratio | | Machine | | | Mixture | |
|---|---|---|---|---|---|---|
| Iron oxide particles (parts by weight) | Inorganic particles (parts by weight) | Kind | Line load (kg/cm) | Operation time (min) | BET Specific surface area ($m^2/g$) | ΔBET ($m^2/g$) |
| 100 | — | Simpson mix muller (Matsumoto Chuzo Tekkosho Co. Ltd.) | 80 | 60 | 2.2 | 0.1 |
| 100 | 3 | Simpson mix muller (Matsumoto Chuzo Tekkosho Co. Ltd.) | 10 | 60 | 12.1 | 10.0 |
| 100 | 3 | Impact pulverizer | — | — | 11.1 | 9.0 |
| 100 | 3 | Blade type Henschel mixer | — | — | 11.1 | 9.0 |
| 100 | — | Simpson mix muller (Matsumoto Chuzo Tekkosho Co. Ltd.) | 80 | 60 | 6.8 | −0.1 |
| 100 | 3 | Simpson mix muller (Matsumoto Chuzo Tekkosho Co. Ltd.) | 20 | 60 | 13.4 | 6.5 |
| 100 | 2 | Simpson mix muller (Matsumoto Chuzo Tekkosho Co. Ltd.) | 80 | 60 | 4.2 | −2.7 |

TABLE 3

| Examples | Kind of resin | Deterioration Glossiness (%) | | | Gelation Numbers of days taken for complete gelation (days) |
|---|---|---|---|---|---|
| | | Immediately after kneading | Three days after kneading | Change | |
| Example 1 | Polyvinyl chloride | 90 | 80 | −10 | — |
| Example 2 | Unsaturated polyester | — | — | — | 15 |
| Example 3 | " | — | — | — | 13 |
| Example 4 | " | — | — | — | 10 |
| Example 5 | Acrylic resin | — | — | — | 7 |
| Example 6 | Polypropylene | 90 | 80 | −10 | — |
| Example 7 | " | 90 | 80 | −10 | — |
| Example 8 | " | 90 | 85 | −5 | — |
| Example 9 | " | 90 | 80 | −10 | — |
| Example 10 | Unsaturated polyester | — | — | — | 8 |
| Example 11 | " | — | — | — | 6 |
| Example 12 | " | — | — | — | 12 |

TABLE 4

| Comp. Examples | Kind of resin | Deterioration Glossiness (%) | | | Gelation Numbers of days taken for complete gelation (days) |
|---|---|---|---|---|---|
| | | Immediately after kneading | Three days after kneading | Change | |
| Comp. Example 1 | Unsaturated polyester | — | — | — | 2 |
| Comp. Example 2 | " | — | — | — | 4 |
| Comp. Example 3 | " | — | — | — | 3 |
| Comp. Example 4 | " | — | — | — | 3 |
| Comp. Example 5 | Polypropylene | 90 | 40 (lost the sheet shape) | −50 | — |
| Comp. Example 6 | " | 90 | 50 (lost the sheet shape) | −40 | — |
| Comp. Example 7 | " | 90 | 60 | −30 | — |

TABLE 5

| | | Magnetite particles being processed | | | | | |
|---|---|---|---|---|---|---|---|
| Examples | Kind | Area-average particle diameter (μm) | Specific surface area ($m^2/g$) | Area shape factor | Specific gravity (g/ml) | Saturation Magnetization (emu/g) | Residual magnetization (emu/g) |
| Example 13 | Spherical magnetite particles produced from aqueous solution | 0.25 | 7.0 | 1.51 | 5.2 | 83.5 | 5.5 |
| Example 14 | Spherical magnetite particles produced from aqueous solution | 0.25 | 7.0 | 1.51 | 5.2 | 83.5 | 5.5 |
| Example 15 | Spherical magnetite particles produced from aqueous solution | 0.25 | 7.0 | 1.51 | 5.2 | 83.5 | 5.5 |
| Example 16 | Spherical magnetite particles produced from aqueous solution | 0.25 | 7.0 | 1.51 | 5.2 | 83.5 | 5.5 |
| Example 17 | Spherical magnetite particles produced from aqueous solution | 0.25 | 7.0 | 1.51 | 5.2 | 83.5 | 5.5 |
| Example 18 | Spherical magnetite particles produced from aqueous solution | 0.25 | 7.0 | 1.51 | 5.2 | 83.5 | 5.5 |
| Example 19 | Spherical magnetite particles produced from aqueous solution | 0.36 | 5.0 | 1.55 | 5.2 | 85.5 | 3.6 |
| Example 20 | Spherical magnetite particles produced from aqueous solution | 0.36 | 5.0 | 1.55 | 5.2 | 85.5 | 3.6 |
| Example 21 | Spherical magnetite particles produced from aqueous solution | 0.15 | 11.9 | 1.55 | 5.2 | 83.0 | 9.5 |
| Example 22 | Spherical magnetite particles produced from aqueous solution | 0.15 | 11.9 | 1.55 | 5.2 | 83.0 | 9.5 |
| Example 23 | Spherical spinal type ferrite particles (containing 2 mol % of zinc calculated as Zn/Fe) | 0.25 | 6.7 | 1.46 | 5.2 | 85.2 | 5.0 |

TABLE 5-continued

| | Silica fine particles | | Kneading conditions | | |
|---|---|---|---|---|---|
| Kind | | Amount (as $SiO_2$) (parts by weight) | Machine | Line load (kg/cm) | Operation time (min) |
| Snowtex ST-40 (Nissan Chemical Industries, Ltd.) | | 2.0 | Simpson mix muller (Matsumoto Chuzo Tekkosho Co. Ltd>) | 40 | 60 |
| Snowtex ST-S (Nissan Chemical Industries, Ltd.) | | 0.8 | Simpson mix muller (Matsumoto Chuzo Tekkosho Co. Ltd>) | 80 | 60 |
| Snowtex ST-XS (Nissan Chemical Industries, Ltd.) | | 0.8 | Simpson mix muller (Matsumoto Chuzo Tekkosho Co. Ltd>) | 80 | 60 |
| Snowtex ST-40 (Nissan Chemical Industries, Ltd.) | | 2.0 | Simpson mix muller (Matsumoto Chuzo Tekkosho Co. Ltd>) | 30 | 60 |
| Snowtex ST-S (Nissan Chemical Industries, Ltd.) | | 0.5 | Simpson mix muller (Matsumoto Chuzo Tekkosho Co. Ltd>) | 80 | 60 |
| Snowtex ST-40 (Nissan Chemical Industries, Ltd.) | | 0.5 | Simpson mix muller (Matsumoto Chuzo Tekkosho Co. Ltd>) | 40 | 60 |
| Snowtex ST-40 (Nissan Chemical Industries, Ltd.) | | 2.0 | Simpson mix muller (Matsumoto Chuzo Tekkosho Co. Ltd>) | 40 | 60 |
| Snowtex ST-S (Nissan Chemical Industries, Ltd.) | | 0.8 | Simpson mix muller (Matsumoto Chuzo Tekkosho Co. Ltd>) | 80 | 60 |
| Snowtex ST-40 (Nissan Chemical Industries, Ltd.) | | 3.0 | Simpson mix muller (Matsumoto Chuzo Tekkosho Co. Ltd>) | 80 | 60 |
| Snowtex ST-S (Nissan Chemical Industries, Ltd.) | | 0.8 | Simpson mix muller (Matsumoto Chuzo Tekkosho Co. Ltd>) | 50 | 60 |
| Snowtex ST-40 (Nissan Chemical Industries, Ltd.) | | 2.0 | Simpson mix muller (Matsumoto Chuzo Tekkosho Co. Ltd.) | 50 | 60 |

TABLE 6

| | Treated magnetite particles | | | | | |
|---|---|---|---|---|---|---|
| Examples | Area-average particle diameter (μm) | BET Specific surface area ($m^2/g$) | ΔBET Specific surface area ($m^2/g$) | Flowability | Saturation Magnetization (emu/g) | Residual magnetization (emu/g) |
| Example 13 | 0.25 | 10.0 | 3.0 | 75 | 81.5 | 5.2 |
| Example 14 | 0.25 | 9.7 | 2.7 | 70 | 82.5 | 5.1 |
| Example 15 | 0.25 | 10.1 | 3.1 | 80 | 82.5 | 5.1 |
| Example 16 | 0.25 | 11.1 | 4.1 | 60 | 81.6 | 5.3 |
| Example 17 | 0.25 | 9.1 | 2.1 | 65 | 82.9 | 5.1 |
| Example 18 | 0.25 | 8.3 | 1.3 | 60 | 82.8 | 5.3 |
| Example 19 | 0.36 | 7.8 | 2.2 | 65 | 83.5 | 3.4 |
| Example 20 | 0.36 | 7.6 | 2.0 | 65 | 84.4 | 3.3 |
| Example 21 | 0.15 | 14.4 | 2.5 | 60 | 80.2 | 9.0 |
| Example 22 | 0.15 | 14.5 | 2.6 | 70 | 82.3 | 9.2 |
| Example 23 | 0.25 | 9.6 | 3.0 | 80 | 83.4 | 4.7 |

TABLE 7

| | | Magnetite particles being processed | | | | | |
|---|---|---|---|---|---|---|---|
| Comp. Examples | Kind | Area-average particle diameter (μm) | Specific surface area ($m^2/g$) | Area shape factor | Specific gravity (g/ml) | Saturation Magnetization (emu/g) | Residual magnetization (emu/g) |
| Comp. Example 8 | Spherical magnetite particles produced from aqueous solution | 0.25 | 7.0 | 1.51 | 5.2 | 83.5 | 5.5 |
| Comp. | Spherical magnetite | 0.25 | 7.0 | 1.51 | 5.2 | 83.5 | 5.5 |

TABLE 7-continued

| | | | | | | | |
|---|---|---|---|---|---|---|---|
| Example 9 | particles produced from aqueous solution | | | | | | |
| Comp. Example 10 | Spherical magnetite particles produced from aqueous solution | 0.25 | 7.0 | 1.51 | 5.2 | 83.5 | 5.5 |
| Comp. Example 11 | Spherical magnetite particles produced from aqueous solution | 0.25 | 7.0 | 1.51 | 5.2 | 83.5 | 5.5 |
| Comp. Example 12 | Spherical magnetite particles produced from aqueous solution | 0.25 | 7.0 | 1.51 | 5.2 | 83.5 | 5.5 |
| Comp. Example 13 | Spherical magnetite particles produced from aqueous solution | 0.25 | 7.0 | 1.51 | 5.2 | 83.5 | 5.5 |

| Silica fine particles | | Kneading conditions | | Operation |
|---|---|---|---|---|
| Kind | Amount (as $SiO_2$) (parts by weight) | Machine | Line Load (kg/cm) | time (min) |
| — | — | Simpson mix muller (Matsumoto Chuzo Tekkosho Co. Ltd.) | 40 | 60 |
| Snowtex ST-40 (Nissan Chemical Industries, Ltd.) | 0.3 | Simpson mix muller (Matsumoto Chuzo Tekkosho Co. Ltd.) | 40 | 60 |
| Snowtex ST-XS (Nissan Chemical Industries, Ltd.) | 4.0 | Simpson mix muller (Matsumoto Chuzo Tekkosho Co. Ltd.) | 40 | 60 |
| Silica gel (500 $m^2/g$) | 0.8 | Simpson mix muller (Matsumoto Chuzo Tekkosho Co. Ltd.) | 80 | 60 |
| Snowtex ST-40 (Nissan Chemical Industries, Ltd.) | 2.5 | Henschel mix muller (Mateumoto Chuzo Tekkosho Co. Ltd.) | — | 60 |
| Titanium coupling agent TTS (Ajinomoto Co., Ltd.) | 1.0 | Simpson mix muller (Matsumoto Chuzo Tekkosho Co. Ltd.) | 40 | 60 |

TABLE 8

| | Treated magnetite particles | | | | | |
|---|---|---|---|---|---|---|
| Comp. Examples | Area-average particle diameter (μm) | BET Specific surface area ($m^2/g$) | ΔBET Specific surface area ($m^2/g$) | Flowability | Saturation Magnetization (emu/g) | Residual magnetization (emu/g) |
| Comp. Example 8 | 0.25 | 6.8 | −0.2 | 45 | 83.3 | 5.3 |
| Comp. Example 9 | 0.25 | 7.8 | 0.8 | 50 | 83.0 | 5.3 |
| Comp. Example 10 | 0.25 | 13.0 | 6.0 | 50 | 80.0 | 5.3 |
| Comp. Example 11 | 0.25 | 11.5 | 4.5 | 50 | 82.6 | 5.2 |
| Comp. Example 12 | 0.25 | 12.3 | 5.3 | 50 | 81.5 | 5.5 |
| Comp. Example 13 | 0.25 | 6.2 | −0.8 | 50 | 82.8 | 5.3 |

TABLE 9

| | | Magnetite particles being processed | | | | | |
|---|---|---|---|---|---|---|---|
| Examples | Kind | Area-average particle diameter (μm) | Specific surface area ($m^2/g$) | Area shape factor | Specific gravity (g/ml) | Saturation Magnetization (emu/g) | $Fe^{2+}/Fe^{3+}$ |
| Example 24 | Hexahedral magnetite particles produced from aqueous solution | 0.23 | 6.5 | 1.30 | 5.2 | 87.5 | 0.38 |
| Example 25 | Hexahedral magnetite | 0.23 | 6.5 | 1.30 | 5.2 | 87.5 | 0.38 |

TABLE 9-continued

| | | | | | | | |
|---|---|---|---|---|---|---|---|
| Example 26 | Hexahedral magnetite particles produced from aqueous solution | 0.23 | 6.5 | 1.30 | 5.2 | 87.5 | 0.38 |
| Example 27 | Hexahedral magnetite particles produced from aqueous solution | 0.23 | 6.5 | 1.30 | 5.2 | 87.5 | 0.38 |
| Example 28 | Hexahedral magnetite particles produced from aqueous solution | 0.23 | 6.5 | 1.30 | 5.2 | 87.5 | 0.38 |
| Example 29 | Hexahedral magnetite particles produced from aqueous solution | 0.14 | 10.7 | 1.30 | 5.2 | 86.5 | 0.32 |
| Example 30 | Hexahedral magnetite particles produced from aqueous solution | 0.32 | 5.0 | 1.35 | 5.2 | 88.0 | 0.41 |
| Example 31 | Hexahedral magnetite particles produced from aqueous solution | 0.36 | 5.0 | 1.35 | 5.2 | 88.0 | 0.41 |
| Example 32 | Hexahedral magnetite particles produced from aqueous solution | 0.23 | 6.5 | 1.30 | 5.2 | 87.5 | 0.38 |
| Example 33 | Hexahedral spinal type ferrite particles (containing 2 mol % of zinc calculated as Zn/Fe) | 0.23 | 6.3 | 1.25 | 5.2 | 89.5 | 0.35 |

| Silica fine particles | | Kneading conditions | | |
|---|---|---|---|---|
| Kind | Amount (as $SiO_2$) (parts by weight) | Machine | Line load (kg/cm) | Operation time (min) |
| Snowtex ST-40 (Nissan Chemical Industries, Ltd.) | 2.0 | Simpson mix muller (Matsumoto Chuzo Tekkosho Co. Ltd.) | 40 | 60 |
| Snowtex ST-S (Nissan Chemical Industries, Ltd.) | 0.8 | Simpson mix muller (Matsumoto Chuzo Tekkosho Co. Ltd.) | 50 | 60 |
| Snowtex ST-XS (Nissan Chemical Industries, Ltd.) | 0.8 | Simpson mix muller (Matsumoto Chuzo Tekkosho Co. Ltd.) | 50 | 60 |
| Snowtex ST-40 (Nissan Chemical Industries, Ltd.) | 2.0 | Simpson mix muller (Matsumoto Chuzo Tekkosho Co. Ltd.) | 30 | 60 |
| Snowtex ST-S (Nissan Chemical Industries, Ltd.) | 0.5 | Simpson mix muller (Matsumoto Chuzo Tekkosho Co. Ltd.) | 40 | 60 |
| Snowtex ST-40 (Nissan Chemical Industries, Ltd.) | 2.0 | Simpson mix muller (Matsumoto Chuzo Tekkosho Co. Ltd.) | 40 | 60 |
| Snowtex ST-40 (Nissan Chemical Industries, Ltd.) | 2.0 | Simpson mix muller (Matsumoto Chuzo Tekkosho Co. Ltd.) | 40 | 60 |
| Snowtex ST-XS (Nissan Chemical Industries, Ltd.) | 3.0 | Simpson mix muller (Matsumoto Chuzo Tekkosho Co. Ltd.) | 50 | 60 |
| Snowtex ST-40 (Nissan Chemical Industries, Ltd.) | 2.0 | Simpson mix muller (Matsumoto Chuzo Tekkosho Co. Ltd.) | 50 | 60 |
| Snowtex ST-40 (Nissan Chemical Industries, Ltd.) | 2.0 | Simpson mix muller (Matsumoto Chuzo Tekkosho Co. Ltd.) | 50 | 60 |

TABLE 10

| | Treated magnetite particles | | | | | |
|---|---|---|---|---|---|---|
| Examples | Area-average particle diameter (μm) | BET Specific surface area ($m^2/g$) | ΔBET Specific surface area ($m^2/g$) | Flowability | Saturation Magnetization (emu/g) | $Fe^{2+}/Fe^{3+}$ |
| Example 24 | 0.23 | 9.6 | 3.1 | 70 | 85.6 | 0.37 |
| Example 25 | 0.23 | 9.0 | 2.5 | 65 | 87.1 | 0.36 |
| Example 26 | 0.23 | 9.3 | 2.8 | 75 | 87.2 | 0.37 |
| Example 27 | 0.23 | 10.8 | 4.2 | 60 | 85.7 | 0.37 |
| Example 28 | 0.23 | 7.9 | 1.3 | 60 | 87.5 | 0.36 |
| Example 29 | 0.14 | 9.2 | 2.6 | 65 | 84.3 | 0.31 |
| Example 30 | 0.32 | 8.0 | 3.3 | 70 | 86.2 | 0.40 |
| Example 31 | 0.32 | 9.2 | 4.5 | 60 | 85.0 | 0.40 |
| Example 32 | 0.23 | 9.4 | 2.7 | 65 | 85.4 | 0.37 |
| Example 33 | 0.23 | 9.5 | 3.2 | 70 | 87.5 | 0.34 |

TABLE 11

| | | Magnetite particles being processed | | | | | |
|---|---|---|---|---|---|---|---|
| Comp. Examples | Kind | Area-average particle diameter (μm) | Specific surface area ($m^2/g$) | Area shape factor | Specific gravity (g/ml) | Saturation Magnetization (emu/g) | $Fe^{2+}/Fe^{3+}$ |
| Comp. Example 14 | Spherical magnetite particles produced from aqueous solution | 0.23 | 6.5 | 1.30 | 5.2 | 87.5 | 0.38 |
| Comp. Example 15 | Spherical magnetite particles produced from aqueous solution | 0.23 | 6.5 | 1.30 | 5.2 | 87.5 | 0.38 |
| Comp. Example 16 | Spherical magnetite particles produced from aqueous solution | 0.23 | 6.5 | 1.30 | 5.2 | 87.5 | 0.38 |
| Comp. Example 17 | Spherical magnetite particles produced from aqueous solution | 0.23 | 6.5 | 1.30 | 5.2 | 87.5 | 0.38 |
| Comp. Example 18 | Spherical magnetite particles produced from aqueous solution | 0.23 | 6.5 | 1.30 | 5.2 | 87.5 | 0.38 |
| Comp. Example 19 | Spherical magnetite particles produced from aqueous solution | 0.23 | 6.5 | 1.30 | 5.2 | 87.5 | 0.38 |

| Silica fine particles | | Kneading conditions | | |
|---|---|---|---|---|
| Kind | Amount (as $SiO_2$) (parts by weight) | Machine | Line load (kg/cm) | Operation time (min) |
| Snowtex ST-40 (Nissan Chemical Industries, Ltd.) | 4.0 | Simpson mix muller (Matsumoto Chuzo Tekkosho Co. Ltd.) | 40 | 60 |
| Snowtex ST-40 (Nissan Chemical Industries, Ltd.) | 0.3 | Simpson mix muller (Matsumoto Chuzo Tekkosho Co. Ltd.) | 40 | 60 |
| Snowtex ST-XS (Nissan Chemical Industries, Ltd.) | 2.5 | Henschel mixer (Mitsui Miike Kogyo Co. Ltd.) | — | 60 |
| Silica gel (500 $m^2/g$) | 0.8 | Simpson mix muller (Matsumoto Chuzo Tekkosho Co. Ltd.) | 40 | 60 |
| — | — | Simpson mix muller (Matsumoto Chuzo Tekkosho Co. Ltd.) | 40 | 60 |
| Titanium coupling agent | 1.0 | Simpson mix muller | 40 | 60 |

TABLE 11-continued

| | |
|---|---|
| TTS (Ajinomoto Co., Ltd.) | (Matsumoto Chuzo Tekkosho Co. Ltd.) |

TABLE 12

| | Treated magnetite particles | | | | | |
|---|---|---|---|---|---|---|
| Comp. Examples | Area-average particle diameter (μm) | BET Specific surface area (m²/g) | ΔBET Specific surface area (m²/g) | Flowability | Saturation Magnetization (emu/g) | $Fe^{2+}/Fe^{3+}$ |
| Comp. Example 14 | 0.23 | 12.0 | 5.5 | 45 | 83.6 | 0.37 |
| Comp. Example 15 | 0.23 | 7.2 | 0.7 | 45 | 86.8 | 0.37 |
| Comp. Example 16 | 0.23 | 11.8 | 5.3 | 45 | 85.7 | 0.38 |
| Comp. Example 17 | 0.23 | 10.9 | 4.4 | 50 | 87.1 | 0.38 |
| Comp. Example 18 | 0.23 | 6.4 | −0.1 | 40 | 87.2 | 0.38 |
| Comp. Example 19 | 0.23 | 5.3 | −1.2 | 50 | 86.8 | 0.38 |

TABLE 13

| | Magnetite particles being processed | | | | | | |
|---|---|---|---|---|---|---|---|
| Examples | Kind | Area-average particle diameter (μm) | Specific surface area (m²/g) | Area shape factor | Specific gravity (g/ml) | Saturation Magnetization (emu/g) | Residual magnetization (emu/g) |
| Example 34 | Octahedral magnetite particles produced from aqueous solution | 0.40 | 5.0 | 1.75 | 5.2 | 85.0 | 10.5 |
| Example 35 | Octahedral magnetite particles produced from aqueous solution | 0.40 | 5.0 | 1.75 | 5.2 | 85.0 | 10.5 |
| Example 36 | Octahedral magnetite particles produced from aqueous solution | 0.40 | 5.0 | 1.75 | 5.2 | 85.0 | 10.5 |
| Example 37 | Octahedral magnetite particles produced from aqueous solution | 0.40 | 5.0 | 1.75 | 5.2 | 85.0 | 10.5 |
| Example 38 | Octahedral magnetite particles produced from aqueous solution | 0.40 | 5.0 | 1.75 | 5.2 | 85.0 | 10.5 |
| Example 39 | Octahedral magnetite particles produced from aqueous solution | 0.25 | 7.6 | 1.65 | 5.2 | 84.0 | 12.0 |
| Example 40 | Octahedral magnetite particles produced from aqueous solution | 0.25 | 7.6 | 1.65 | 5.2 | 84.0 | 12.0 |
| Example 41 | Octahedral magnetite particles produced from aqueous solution | 0.15 | 12.7 | 1.65 | 5.2 | 82.5 | 16.0 |
| Example 42 | Octahedral magnetite particles produced from aqueous solution | 0.40 | 5.0 | 1.75 | 5.2 | 85.0 | 10.5 |
| Example 43 | Octahedral spinal type ferrite particles (containing 2 mol % of zinc calculated as Zn/Fe) | 0.27 | 7.3 | 1.70 | 5.2 | 86.5 | 11.0 |

| Silica fine particles | | Kneading conditions | | |
|---|---|---|---|---|
| Kind | Amount (as $SiO_2$) (parts by weight) | Machine | Line load (kg/cm) | Operation time (min) |
| Snowtex ST-40 (Nissan | 2.0 | Simpson mix muller | 40 | 60 |

TABLE 13-continued

| | | | | |
|---|---|---|---|---|
| Chemical Industries, Ltd.) | | (Matsumoto Chuzo Tekkosho Co. Ltd.) | | |
| Snowtex ST-S (Nissan Chemical Industries, Ltd.) | 0.8 | Simpson mix muller (Matsumoto Chuzo Tekkosho Co. Ltd.) | 40 | 60 |
| Snowtex ST-XS (Nissan Chemical Industries, Ltd.) | 0.8 | Simpson mix muller (Matsumoto Chuzo Tekkosho Co. Ltd.) | 40 | 60 |
| Snowtex ST-40 (Nissan Chemical Industries, Ltd.) | 2.0 | Simpson mix muller (Matsumoto Chuzo Tekkosho Co. Ltd.) | 30 | 60 |
| Snowtex ST-S (Nissan Chemical Industries, Ltd.) | 0.5 | Simpson mix muller (Matsumoto Chuzo Tekkosho Co. Ltd.) | 40 | 60 |
| Snowtex ST-40 (Nissan Chemical Industries, Ltd.) | 2.0 | Simpson mix muller (Matsumoto Chuzo Tekkosho Co. Ltd.) | 40 | 60 |
| Snowtex ST-XS (Nissan Chemical Industries, Ltd.) | 2.0 | Simpson mix muller (Matsumoto Chuzo Tekkosho Co. Ltd.) | 40 | 60 |
| Snowtex ST-S (Nissan Chemical Industries, Ltd.) | 0.8 | Simpson mix muller (Matsumoto Chuzo Tekkosho Co. Ltd.) | 80 | 60 |
| Snowtex ST-40 (Nissan Chemical Industries, Ltd.) | 3.0 | Simpson mix muller (Matsumoto Chuzo Tekkosho Co. Ltd.) | 80 | 60 |
| Snowtex ST-40 (Nissan Chemical Industries, Ltd.) | 2.0 | Simpson mix muller (Matsumoto Chuzo Tekkosho Co. Ltd.) | 40 | 60 |

TABLE 14

| | Treated magnetite particles | | | | | |
|---|---|---|---|---|---|---|
| Examples | Area-average particle diameter (μm) | BET Specific surface area ($m^2/g$) | ΔBET Specific surface area ($m^2/g$) | Flowability | Saturation Magnetization (emu/g) | Residual magnetization (emu/g) |
| Example 34 | 0.40 | 8.2 | 3.2 | 75 | 83.1 | 10.1 |
| Example 35 | 0.40 | 7.6 | 2.6 | 70 | 84.0 | 10.1 |
| Example 36 | 0.40 | 8.0 | 3.0 | 70 | 83.9 | 10.2 |
| Example 37 | 0.40 | 9.1 | 4.3 | 60 | 83.2 | 10.2 |
| Example 38 | 0.40 | 6.1 | 1.1 | 60 | 84.2 | 10.2 |
| Example 39 | 0.25 | 10.4 | 2.8 | 70 | 82.3 | 11.7 |
| Example 40 | 0.25 | 11.3 | 3.7 | 65 | 81.5 | 11.6 |
| Example 41 | 0.15 | 15.2 | 2.5 | 65 | 81.2 | 15.5 |
| Example 42 | 0.15 | 7.6 | 2.5 | 65 | 83.2 | 10.1 |
| Example 43 | 0.27 | 10.6 | 3.0 | 70 | 84.5 | 10.7 |

TABLE 15

| | Magnetite particles being processed | | | | | | |
|---|---|---|---|---|---|---|---|
| Comp. Examples | Kind | Area-average particle diameter (μm) | Specific surface area ($m^2/g$) | Area shape factor | Specific gravity (g/ml) | Saturation Magnetization (emu/g) | Residual magnetization (emu/g) |
| Comp. Example 20 | Spherical magnetite particles produced from aqueous solution | 0.40 | 5.0 | 1.75 | 5.2 | 85.0 | 10.5 |
| Comp. Example 21 | Spherical magnetite particles produced from aqueous solution | 0.40 | 5.0 | 1.75 | 5.2 | 85.0 | 10.5 |
| Comp. Example 22 | Spherical magnetite particles produced from aqueous solution | 0.40 | 5.0 | 1.75 | 5.2 | 85.0 | 10.5 |
| Comp. Example 23 | Spherical magnetite particles produced from aqueous solution | 0.40 | 5.0 | 1.75 | 5.2 | 85.0 | 10.5 |
| Comp. Example 24 | Spherical magnetite particles produced from aqueous solution | 0.40 | 5.0 | 1.75 | 5.2 | 85.0 | 10.5 |
| Comp. Example 25 | Spherical magnetite particles produced from | 0.40 | 5.0 | 1.75 | 5.2 | 85.0 | 10.5 |

TABLE 15-continued aqueous solution

| | Silica fine particles | | Kneading conditions | | |
|---|---|---|---|---|---|
| Kind | | Amount (as $SiO_2$) (parts by weight) | Machine | Line load (kg/cm) | Operation time (min) |
| Snowtex ST-40 (Nissan Chemical Industries, Ltd.) | | 4.0 | Simpson mix muller (Matsumoto Chuzo Tekkosho Co. Ltd.) | 40 | 60 |
| Snowtex ST-40 (Nissan Chemical Industries, Ltd.) | | 0.3 | Simpson mix muller (Matsumoto Chuzo Tekkosho Co. Ltd.) | 40 | 60 |
| Snowtex ST-40 (Nissan Chemical Industries, Ltd.) | | 2.5 | Simpson mix muller (Matsumoto Chuzo Tekkosho Co. Ltd.) | 40 | 60 |
| Silica gel (500 $m^2$/g) | | 0.8 | Henschel mixer (Mitsui Miike Kogyo Co. Ltd.) | — | 60 |
| — | | — | Simpson mix muller (Matsumoto Chuzo Tekkosho Co. Ltd.) | 40 | 60 |
| Titanium coupling agent TTS (Ajinomoto Co., Ltd.) | | 1.0 | Simpson mix muller (Matsumoto Chuzo Tekkosho Co. Ltd.) | 40 | 60 |

TABLE 16

| | Treated magnetite particles | | | | | |
|---|---|---|---|---|---|---|
| Comp. Examples | Area-average particle diameter (μm) | BET Specific surface area ($m^2$/g) | ΔBET Specific surface area ($m^2$/g) | Flowability | Saturation Magnetization (emu/g) | Residual magnetization (emu/g) |
| Comp. Example 20 | 0.40 | 10.7 | 5.7 | 45 | 81.3 | 10.2 |
| Comp. Example 21 | 0.40 | 5.8 | 0.8 | 50 | 83.0 | 10.3 |
| Comp. Example 22 | 0.40 | 10.2 | 5.2 | 50 | 82.5 | 10.4 |
| Comp. Example 23 | 0.40 | 9.6 | 4.6 | 50 | 84.0 | 10.2 |
| Comp. Example 24 | 0.40 | 4.8 | −0.2 | 50 | 84.7 | 10.2 |
| Comp. | 0.40 | 4.1 | −0.9 | 50 | 83.6 | 10.2 |

TABLE 17

| | | Magnetic toner | | | |
|---|---|---|---|---|---|
| Examples | Kind of Magnetic particles | Flowability | Fine line reproducibility | Photografic fog | Toner flown about |
| Example 44 | Treated magnetite particles in Ex. 13 | 90 | 1.45 | 4 | 4 |
| Example 45 | Treated magnetite particles in Ex. 14 | 90 | 1.50 | 4 | 4 |
| Example 46 | Treated magnetite particles in Ex. 15 | 95 | 1.50 | 4 | 4 |
| Example 47 | Treated magnetite particles in Ex. 16 | 85 | 1.35 | 4 | 3 |
| Example 48 | Treated magnetite particles in Ex. 17 | 85 | 1.40 | 4 | 3 |
| Example 49 | Treated magnetite particles in Ex. 18 | 80 | 1.30 | 3 | 3 |
| Example 50 | Treated magnetite particles in Ex. 19 | 85 | 1.35 | 4 | 3 |
| Example 51 | Treated magnetite particles in Ex. 20 | 85 | 1.40 | 4 | 3 |
| Example 52 | Treated magnetite particles in | 80 | 1.35 | 3 | 3 |

TABLE 17-continued

| Examples | Kind of Magnetic particles | Magnetic toner | | | |
|---|---|---|---|---|---|
| | | Flowability | Fine line reproducibility | Photografic fog | Toner flown about |
| Example 53 | Treated magnetite particles in Ex. 21 | 90 | 1.45 | 4 | 4 |
| Example 54 | Treated magnetite particles in Ex. 22 | 90 | 1.45 | 4 | 4 |
| | Treated magnetite particles in Ex. 23 | | | | |
| Comp. Examples | | | | | |
| Comp. Example 26 | Treated magnetite particles in Comp. Ex. 8 | 70 | 1.20 | 2 | 2 |
| Comp. Example 27 | Treated magnetite particles in Comp. Ex. 9 | 75 | 1.25 | 3 | 2 |
| Comp. Example 28 | Treated magnetite particles in Comp. Ex. 10 | 70 | 1.20 | 2 | 1 |
| Comp. Example 29 | Treated magnetite particles in Comp. Ex. 11 | 75 | 1.30 | 2 | 2 |
| Comp. Example 30 | Treated magnetite particles in Comp. Ex. 12 | 70 | 1.25 | 1 | 2 |
| Comp. Example 31 | Treated magnetite particles in Comp. Ex. 13 | 75 | 1.30 | 2 | 2 |

TABLE 18

| Examples | Kind of Magnetic particles | Magnetic toner | | | |
|---|---|---|---|---|---|
| | | Flowability | Fine line reproducibility | Photografic fog | Toner flown about |
| Example 55 | Treated magnetite particles in Ex. 24 | 85 | 1.45 | 4 | 4 |
| Example 56 | Treated magnetite particles in Ex. 25 | 85 | 1.50 | 4 | 3 |
| Example 57 | Treated magnetite particles in Ex. 26 | 90 | 1.50 | 4 | 4 |
| Example 58 | Treated magnetite particles in Ex. 27 | 80 | 1.35 | 3 | 3 |
| Example 59 | Treated magnetite particles in Ex. 28 | 80 | 1.40 | 3 | 3 |
| Example 60 | Treated magnetite particles in Ex. 29 | 85 | 1.40 | 4 | 3 |
| Example 61 | Treated magnetite particles in Ex. 30 | 90 | 1.45 | 4 | 4 |
| Example 62 | Treated magnetite particles in Ex. 31 | 80 | 1.40 | 3 | 3 |
| Example 63 | Treated magnetite particles in Ex. 32 | 85 | 1.40 | 4 | 3 |
| Example 64 | Treated magnetite particles in Ex. 33 | 85 | 1.35 | 4 | 3 |
| Comp. Examples | | | | | |
| Comp. Example 32 | Treated magnetite particles in Comp. Ex. 14 | 70 | 1.20 | 2 | 2 |
| Comp. Example 33 | Treated magnetite particles in Comp. Ex. 15 | 70 | 1.25 | 2 | 2 |
| Comp. Example 34 | Treated magnetite particles in Comp. Ex. 16 | 70 | 1.20 | 2 | 1 |
| Comp. Example 35 | Treated magnetite particles in Comp. Ex. 17 | 75 | 1.30 | 3 | 2 |
| Comp. Example 36 | Treated magnetite particles in Comp. Ex. 18 | 65 | 1.20 | 1 | 1 |
| Comp. Example 37 | Treated magnetite particles in Comp. Ex. 19 | 70 | 1.30 | 2 | 2 |

TABLE 19

| Examples and Comp. Examples | Kind of Magnetic particles | Magnetic toner | | | |
|---|---|---|---|---|---|
| | | Flowability | Fine line reproducibility | Photografic fog | Toner flown about |
| Example 65 | Treated magnetite particles in Ex. 34 | 90 | 4 | 4 | 4 |
| Example 66 | Treated magnetite particles in Ex. 35 | 90 | 4 | 4 | 4 |
| Example 67 | Treated magnetite particles in Ex. 36 | 90 | 4 | 4 | 4 |
| Example 68 | Treated magnetite particles in Ex. 37 | 80 | 3 | 3 | 3 |
| Example 69 | Treated magnetite particles in Ex. 38 | 80 | 3 | 3 | 3 |
| Example 70 | Treated magnetite particles in Ex. 39 | 80 | 3 | 3 | 3 |
| Example 71 | Treated magnetite particles in Ex. 40 | 85 | 3 | 4 | 3 |
| Example 72 | Treated magnetite particles in Ex. 41 | 85 | 3 | 4 | 3 |
| Example 73 | Treated magnetite particles in Ex. 42 | 80 | 3 | 3 | 3 |
| Example 74 | Treated magnetite particles in Ex. 43 | 90 | 4 | 4 | 4 |
| Comp. Example 38 | Treated magnetite particles in Comp. Ex. 20 | 70 | 2 | 2 | 1 |
| Comp. Example 39 | Treated magnetite particles in Comp. Ex. 21 | 75 | 2 | 2 | 2 |
| Comp. Example 40 | Treated magnetite particles in Comp. Ex. 22 | 70 | 1 | 2 | 1 |
| Comp. Example 41 | Treated magnetite particles in Comp. Ex. 23 | 75 | 2 | 2 | 2 |
| Comp. Example 42 | Treated magnetite particles in Comp. Ex. 24 | 70 | 2 | 2 | 1 |
| Comp. Example 43 | Treated magnetite particles in Comp. Ex. 25 | 70 | 2 | 2 | 2 |

What is claimed is:

1. Iron oxide particles comprising:

100 parts by weight of iron oxide particles having an area-average particle diameter of $0.1\ \mu m \leq d_3 \leq 1.0\ \mu m$, an area shape factor of $1.0 \leq \phi_s \leq 2.0$ and a BET specific surface area represented by the formula (1):

$$6/(\rho \cdot d_3) \times \phi_s \quad (1)$$

wherein $\rho$ represents the specific gravity of said iron oxide particles, $d_3$ represents the area-average particle diameter and $\phi_s$ represents the area shape factor, and 0.25 to 10 parts by weight, calculated as an oxide, of the fine particles of an oxide, a hydroxide, a hydroxide oxide, a hydrous oxide and a mixture thereof of an element selected from the group consisting of Al, Si, Zr and Ti, which fine particles are adhered to the surfaces of said iron oxide particles, the increment of said BET specific surface area of said iron oxide particles being 1 to 6 m²/g, and the increment of said BET specific surface area with respect to the amount of said fine particles being not less than 0.35.

2. Iron oxide particles according to claim 1 comprising:

100 parts by weight of spherical spinel-type iron oxide particles having a BET specific surface area represented by the formula (2):

$$6/(\rho_1 \cdot d_{31}) \times \phi_{s1} \quad (2)$$

wherein $\rho_1$ represents the specific gravity of said spherical spinel-type iron oxide particles, $d_{31}$ represents an area-average particle diameter $(0.1\ \mu m \leq d_{31} \leq 0.5\ \mu m)$, and $\phi_{s1}$ represents an area shape factor $(1.40 \leq \phi_{s1} \leq 1.60)$, and 0.5 to 3.5 parts by weight, calculated as SiO₂, of fine silica particles which are adhered to the surfaces of said spherical spinel-type iron oxide particles, the increment of said BET specific surface area over said spherical spinel-type iron oxide particles being 1 to 5 m²/g, and the increment of said BET specific surface area with respect to the amount of said fine silica particles being 1.0 to 4.5.

3. Iron oxide particles according to claim 1 comprising:

100 parts by weight of hexahedral spinel-type iron oxide particles having a specific surface area represented by the formula (3):

$$6/(\rho_2 \cdot d_{32}) \times \phi_{s2} \quad (3)$$

wherein $\rho_2$ represents the specific gravity of said hexahedral spinel-type iron oxide particles, $d_{32}$ represents an area-average particle diameter $(0.1\ \mu m \leq d_{32} \leq 0.5\ \mu m)$, and $\phi_{s2}$ represents an area shape factor $(1.20 \leq \phi_{s2} < 1.40)$, and 0.5 to 3.5 parts by weight, calculated as SiO₂, of fine silica particles which are adhered to the surfaces of said hexahedral spinel-type iron oxide particles, the increment of said BET specific surface area over said hexahedral spinel-type iron oxide particles being 1 to 5 m²/g, and the increment of said BET specific surface area with respect to the amount of said fine silica particles being 1.0 to 4.5.

4. Iron oxide particles according to claim 1 comprising:

100 parts by weight of octahedral spinel-type iron oxide particles having a BET specific surface area represented by the formula (4):

$$6/(\rho_3 \cdot d_{33}) \times \varphi_{s3} \qquad (4)$$

wherein $\rho_3$ represents the specific gravity of said octahedral spinel-type iron oxide particles, $d_{33}$ represents an area-average particle diameter ($0.1~\mu m \leq d_{33} \leq 0.5~\mu m$), and $\varphi_{s3}$ represents an area shape factor ($1.60 < \varphi_{s3} \leq 1.80$), and 0.5 to 3.5 parts by weight, calculated as $SiO_2$, of fine silica particles which are adhered to the surfaces of said octahedral spinel-type iron oxide particles, the increment of said BET specific surface area over said octahedral spinel-type iron oxide particles being 1 to 5 $m^2/g$, and the increment of said BET specific surface area with respect to the amount of said fine silica particles being 1.0 to 4.5.

5. Iron oxide particles according to claim 1, wherein the iron oxide particles are completely spherical iron oxide particles, spherical iron oxide particles, irregular shape iron oxide particles, cubic iron oxide particles, hexahedral iron oxide particles, or octahedral iron oxide particles.

6. Iron oxide particles according to claim 2, wherein the BET specific surface are of the fine silica particles is 100 to 450 $m^2/g$.

7. Iron oxide particles according to claim 3, wherein the BET specific surface are of the fine silica particles is 100 to 450 $m^2/g$.

8. Iron oxide particles according to claim 4, wherein the BET specific surface are of the fine silica particles is 100 to 450 $m^2/g$.

9. Iron oxide particles comprising:

100 parts by weight of iron oxide particles having an area-average particle diameter of $0.1~\mu m \leq d_3 \leq 1.0~\mu m$, an area shape factor of $1.0 \leq \varphi_s \leq 2.0$ and a BET specific surface area represented by the formula (1):

$$6/(\rho \cdot d_3) \times \varphi_s \qquad (1)$$

wherein $\rho$ represents the specific gravity of said iron oxide particles, $d_3$ represents the area-average particle diameter and $\varphi_s$ represents the area shape factor, and 0.25 to 10 parts by weight, calculated as an oxide, of the fine particles of an oxide, a hydroxide, a hydroxide oxide, a hydrous oxide and a mixture thereof of an element selected from the group consisting of Al, Si, Zr and Ti, which fine particles are adhered to the surfaces of said iron oxide particles, the increment of said BET specific surface area of said iron oxide particles being 1 to 6 $m^2/g$, and the increment of said BET specific surface area with respect to the amount of said fine particles being not less than 0.35, said iron oxide particles being produced by mixing said iron oxide particles and said fine particles by compressing, shearing and spatula-stroking in a wheel-type kneader.

* * * * *

UNITED STATES PATENT AND TRADEMARK OFFICE
CERTIFICATE OF CORRECTION

PATENT NO.   : 5,470,660
DATED        : November 28, 1995
INVENTOR(S)  : MISAWA et al It is certified that error appears in the above-identified patent and that said letters patent is hereby corrected as shown below:

Columns 35-36, Table 6 under the heading $\Delta$BET Specific surface area change Example 19 from 2.2 to read --2.8--; Example 20 from 2.0 to read --2.6--; Example 23 from 3.0 to read --2.9--. Columns 41-42, Table 10, under the heading $\Delta$BET Specific surface area change Example 27 from 4.2 to read --4.3--; Example 28 from 1.3 to read --1.4--; Example 30 from 3.3 to read --3.0--; Example 31 from 4.5 to read --4.2--; Example 32 from 2.7 to read --2.9--. Columns 45-46, Table 14, under the heading $\Delta$BET Specific surface area change Example 37 from 4.3 to read --4.1--; Example 42 from 2.5 to read --2.6--; Example 43 from 3.0 to read --3.3--.

Signed and Sealed this

Fifth Day of November, 1996

Attest:

BRUCE LEHMAN

*Attesting Officer*           *Commissioner of Patents and Trademarks*